Figure 1:
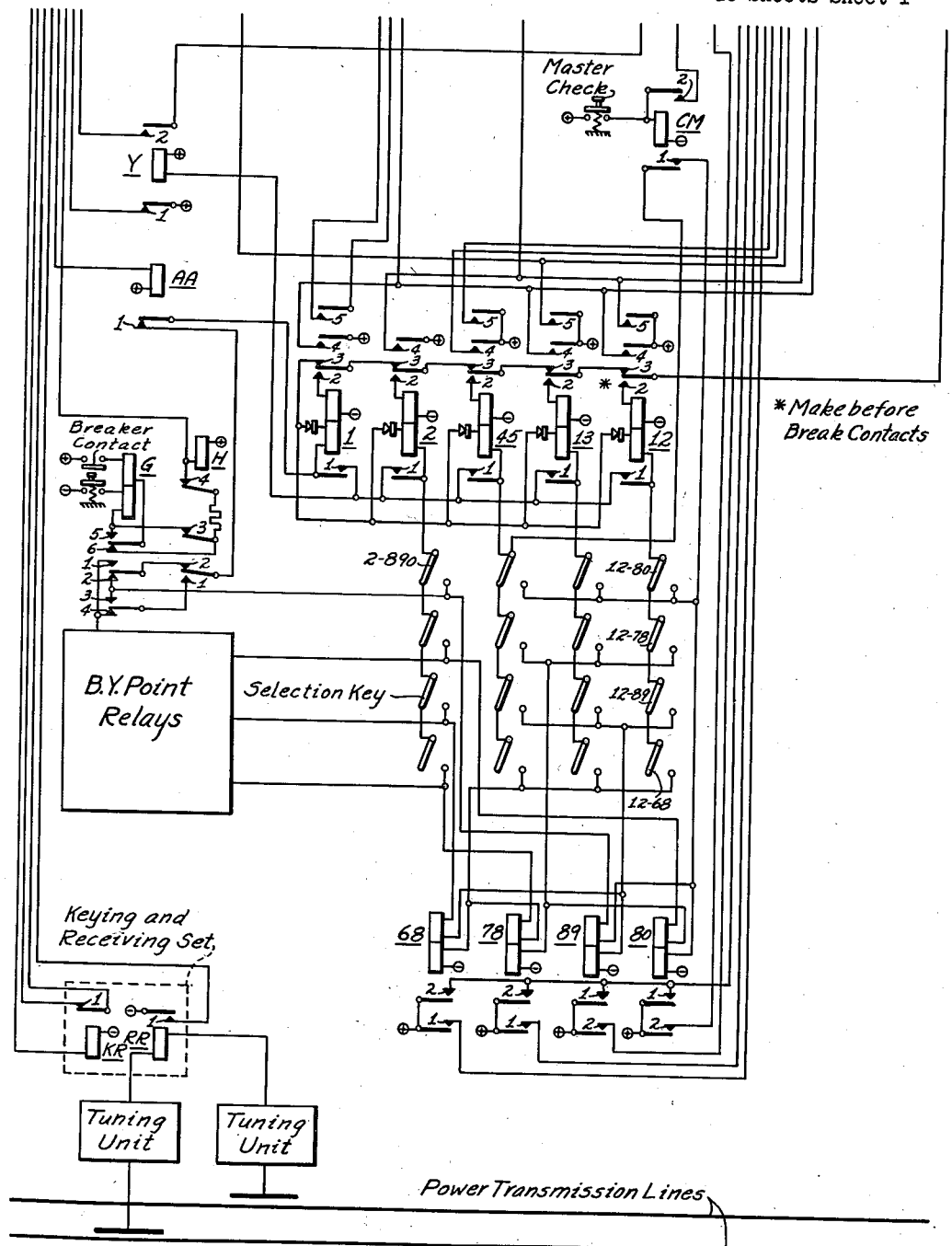
Figure 2:
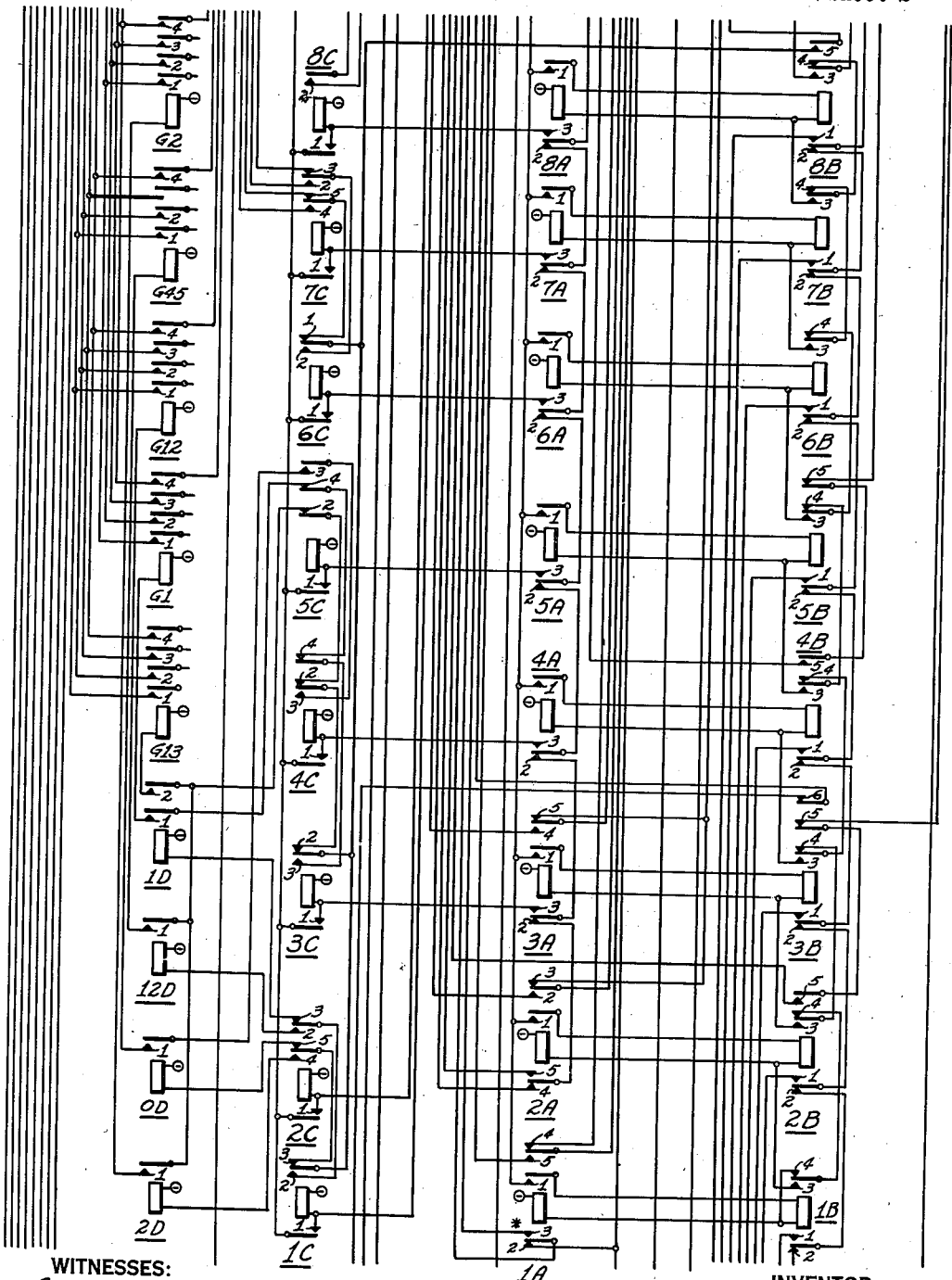
Figure 3:
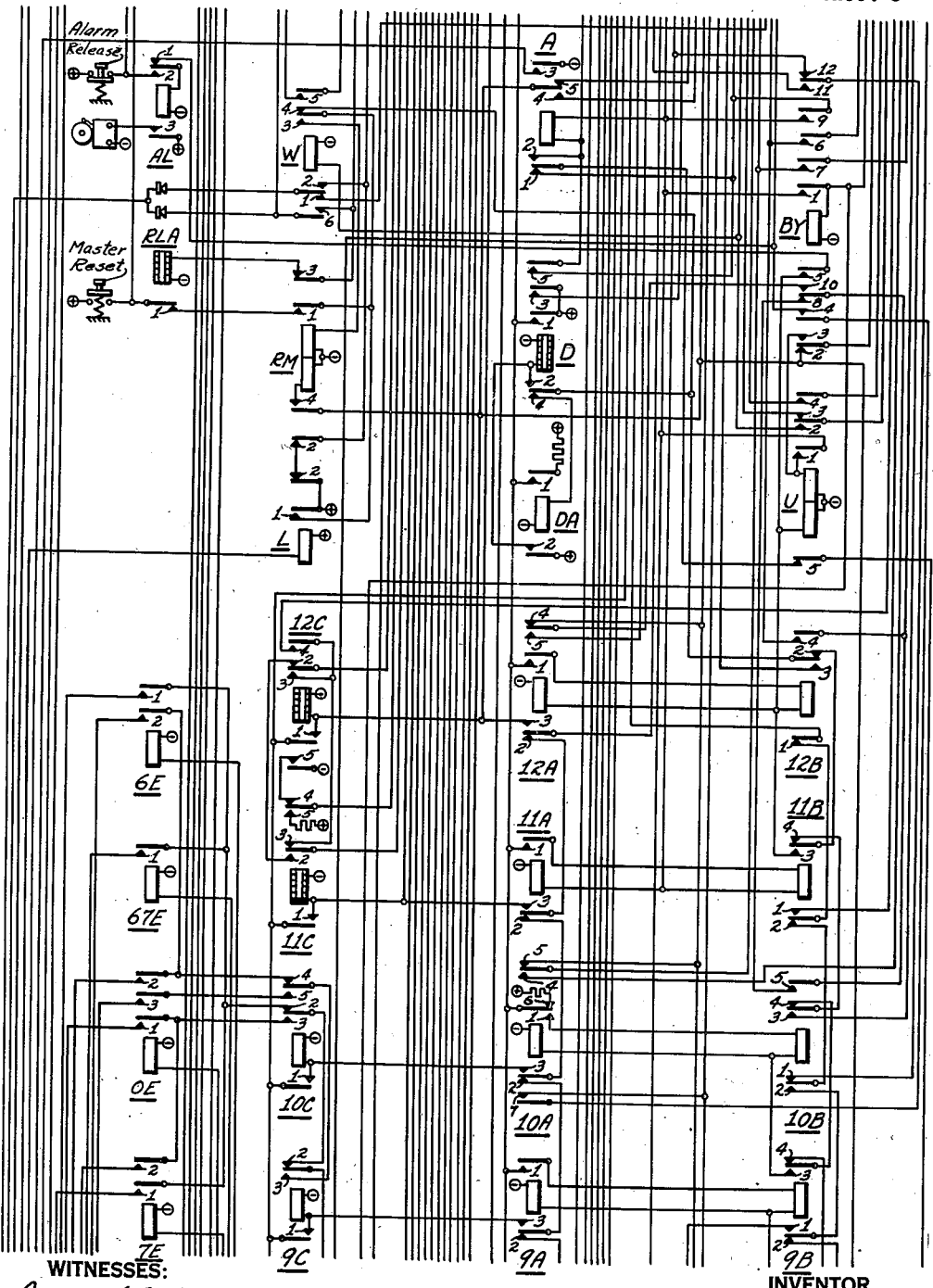
Figure 4:
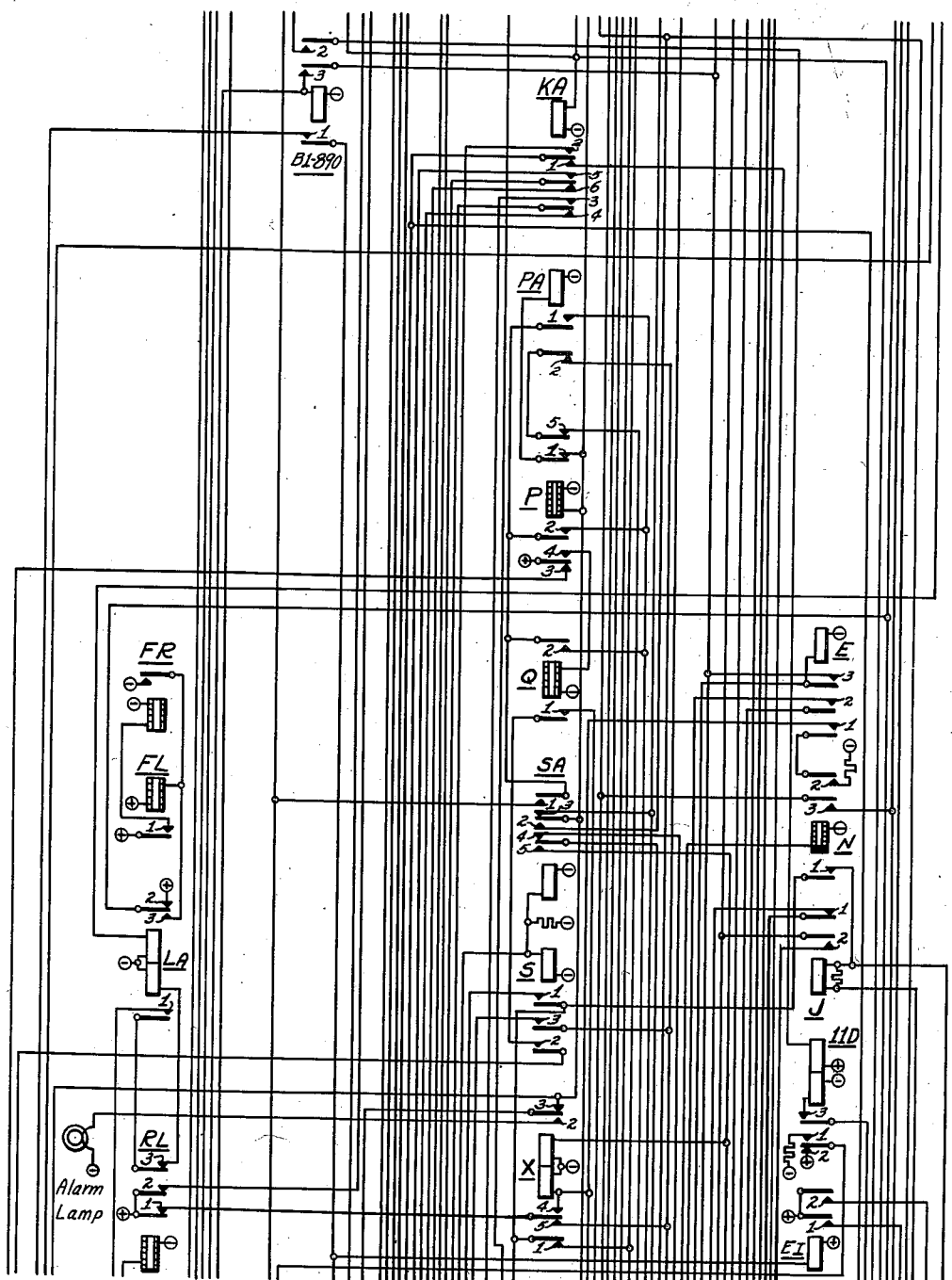
Figure 5:
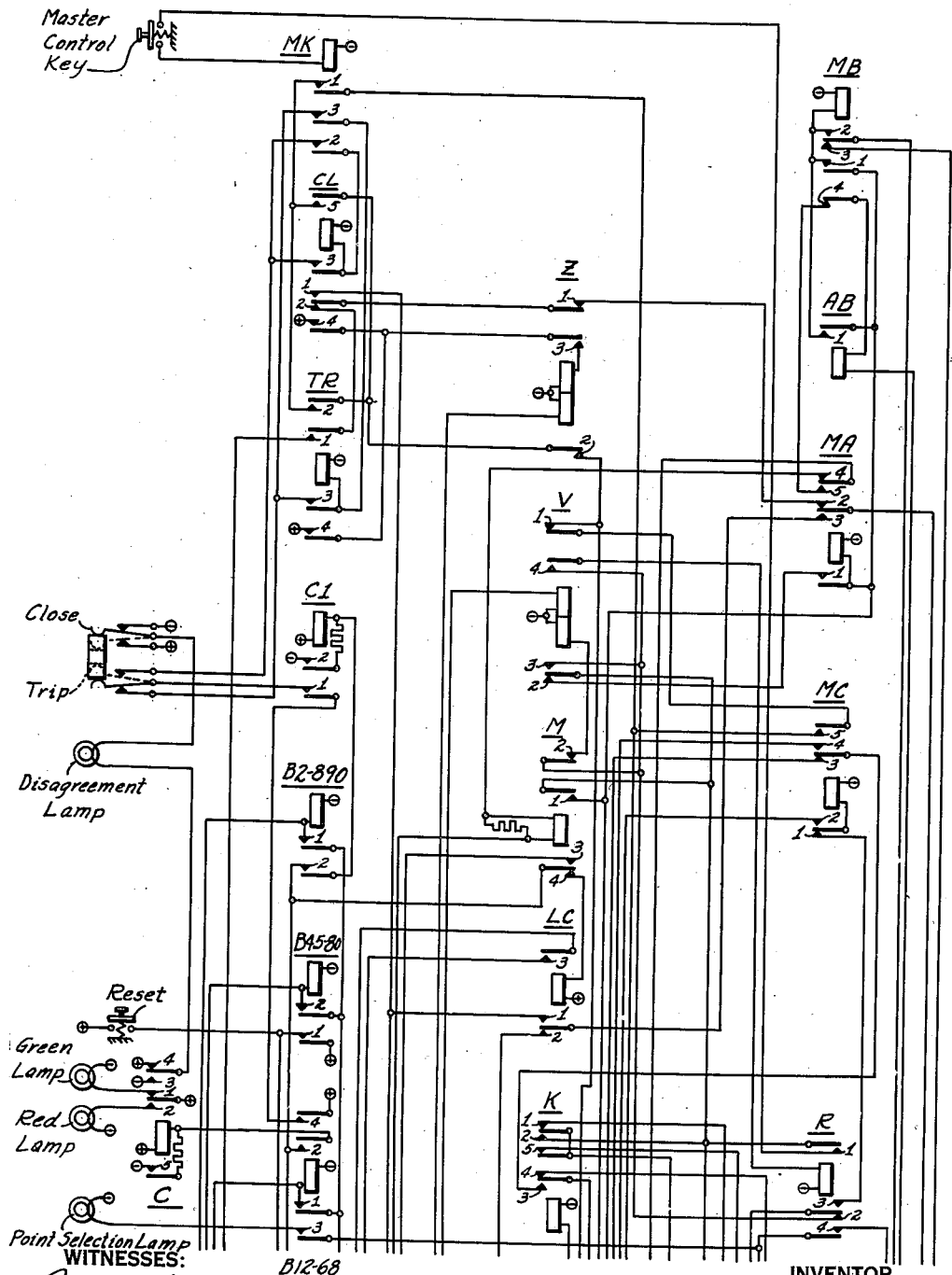
Figure 6:
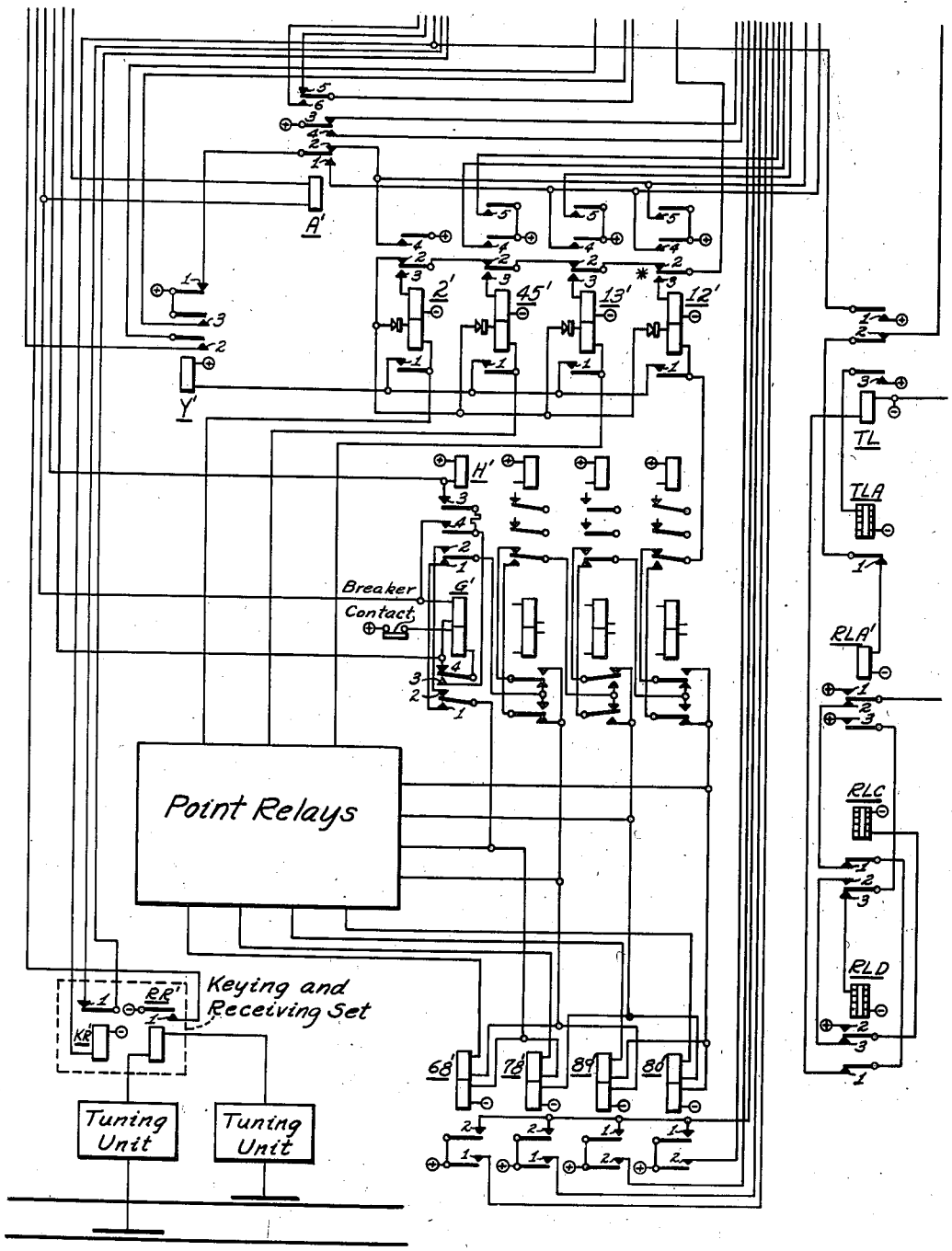
Figure 7:
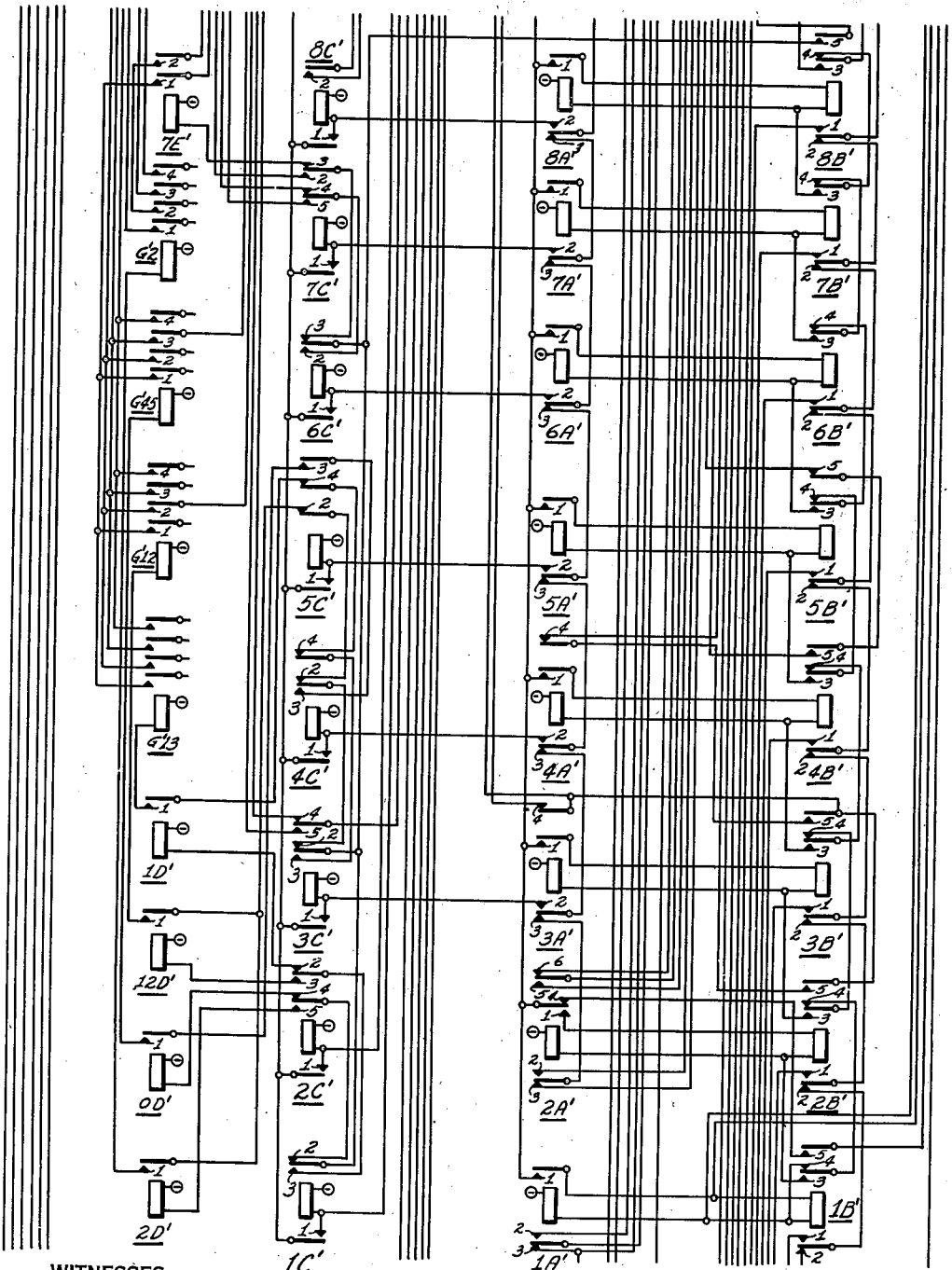
Figure 8:
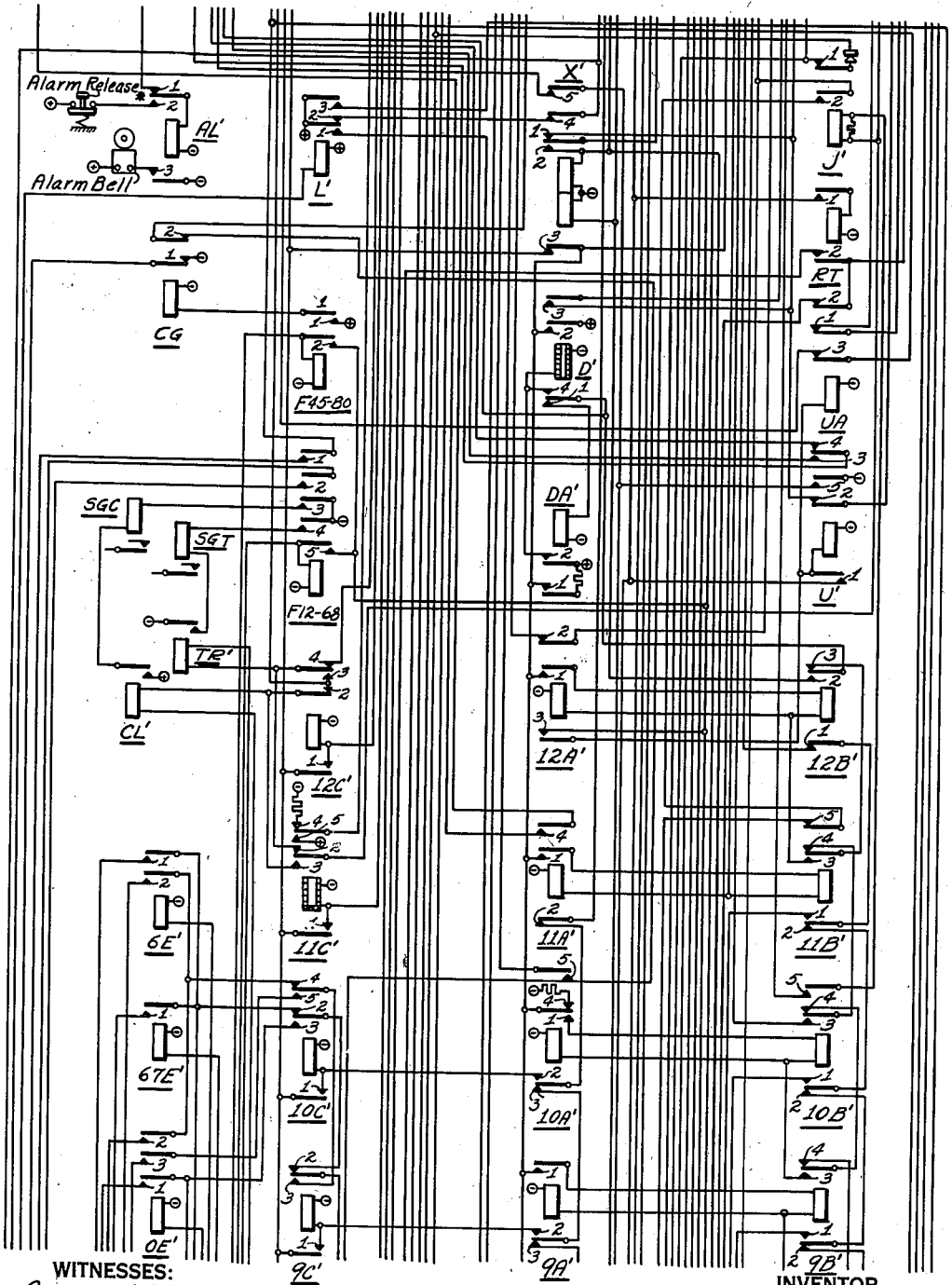
Figure 9:
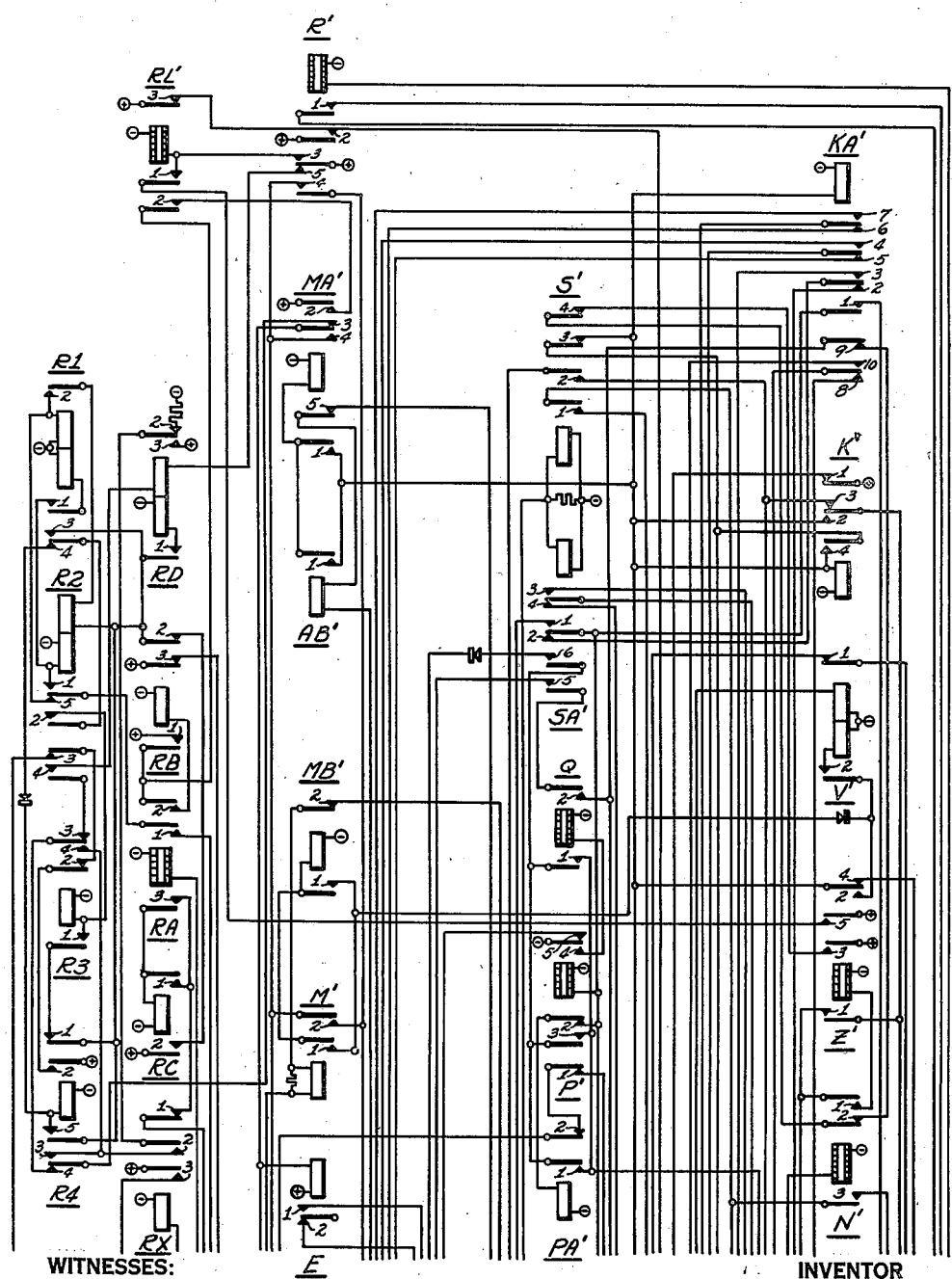

March 17, 1942.   H. P. BOSWAU   2,276,646
SUPERVISORY CONTROL SYSTEM
Filed Jan. 18, 1939   13 Sheets-Sheet 12
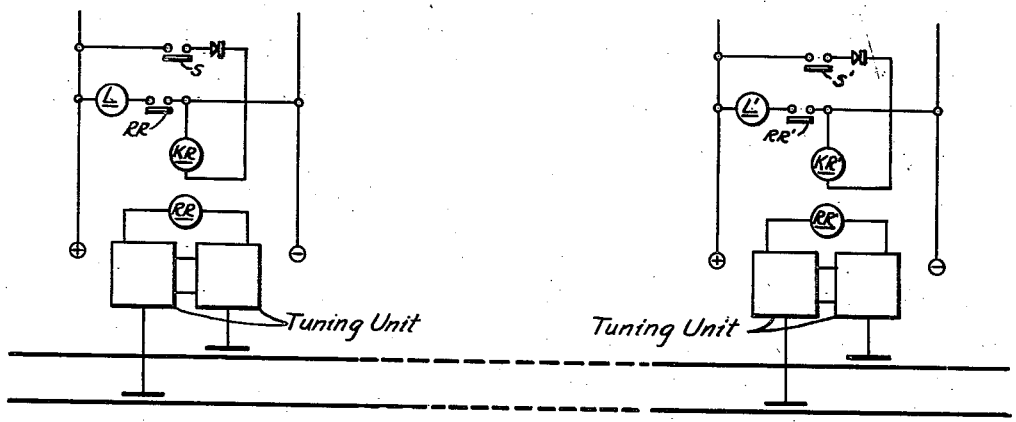
Fig. 13.
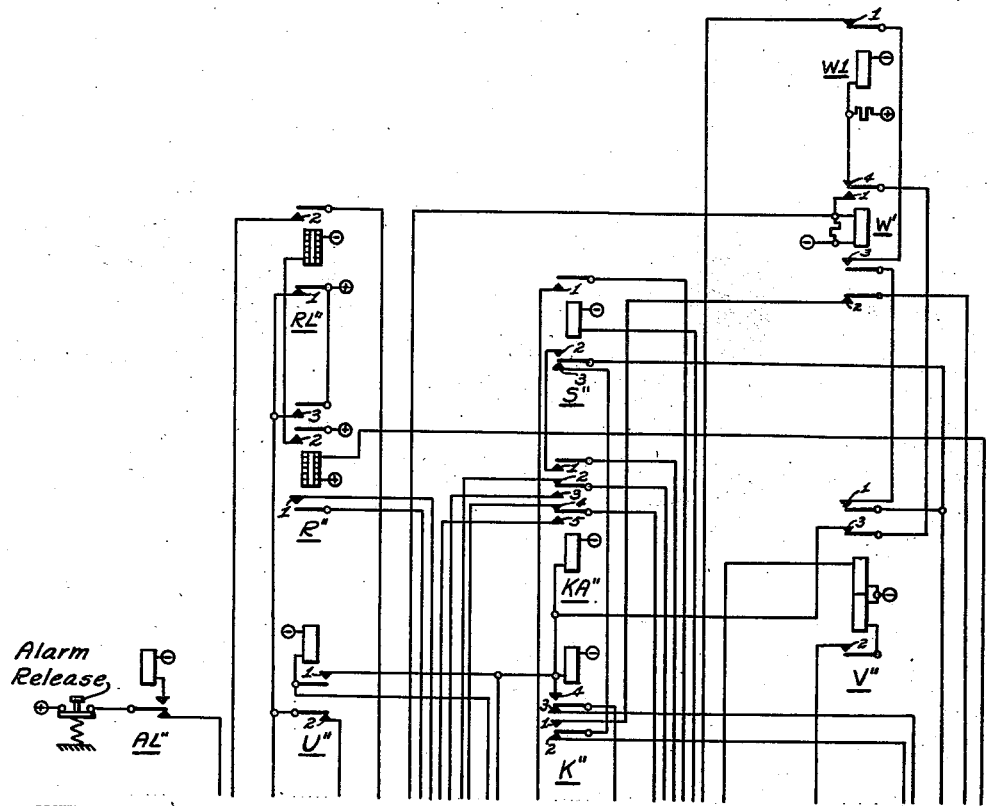
WITNESSES:   Fig. 12.   INVENTOR
   Hans P. Boswau.
   BY
   ATTORNEY March 17, 1942.  H. P. BOSWAU  2,276,646
SUPERVISORY CONTROL SYSTEM
Filed Jan. 18, 1939  13 Sheets-Sheet 13
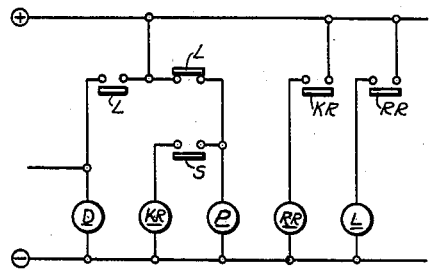
Fig. 14.
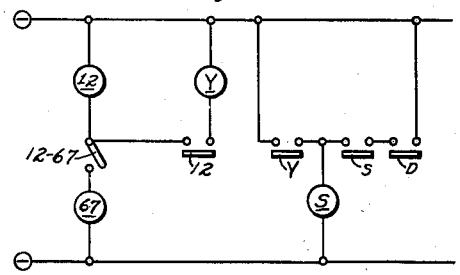
Fig. 15.
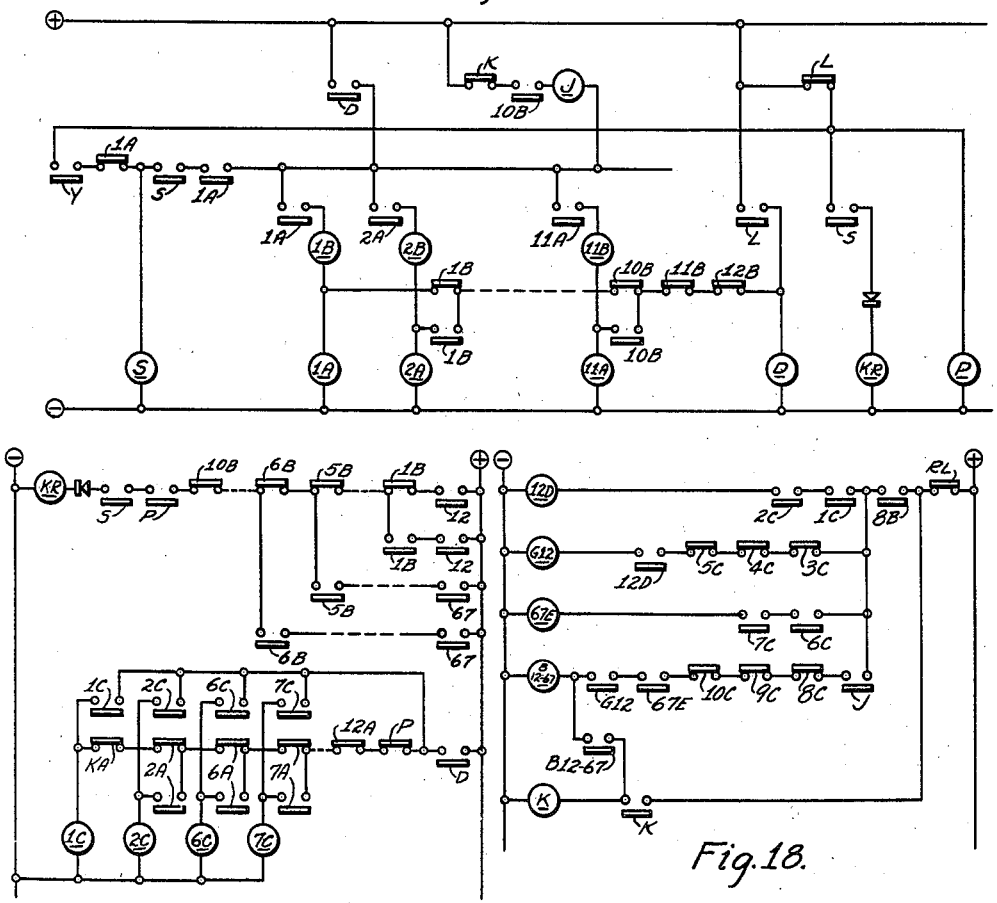
Fig. 16.
Fig. 17.
Fig. 18.
WITNESSES:
James F. Young
INVENTOR
Hans P. Boswau.
BY
Crawford
ATTORNEY Patented Mar. 17, 1942

2,276,646

UNITED STATES PATENT OFFICE 2,276,646

SUPERVISORY CONTROL SYSTEM

Hans P. Boswau, Lorain, Ohio, assignor to Westinghouse Electric & Manufacturing Company, East Pittsburgh, Pa., a corporation of Pennsylvania Application January 18, 1939, Serial No. 251,520

13 Claims. (Cl. 177—353)

My invention relates, generally, to signalling systems and more particularly to supervisory control systems in which a plurality of operating units located in remotely disposed stations are selectively controlled and supervised over a single signalling channel.

In prior supervisory control systems, with which I am familiar, where a number of substations are supervised and controlled from a dispatching office by means of code signals transmitted over a single signalling channel, the time required for transmitting the selection and operation codes and receiving the necessary check backs between each code makes these prior systems too slow for utilization on power systems having a large number of operating units to be controlled and supervised.

Accordingly, an object of my invention is to provide a fast and positively interlocked supervisory control system for controlling and supervising a plurality of operating units over a single signalling circuit.

A further object of my invention is to provide for complete control and supervision of the apparatus units of a power system from a dispatcher's office and at the same time provide a complete indication of the position of the apparatus units at a supervising office located remotely from the dispatcher's office.

Another object of my invention is to indicate to the operating dispatcher whether or not the supervising dispatcher is receiving the code signals correctly.

A still further object of my invention is to so coordinate a direct wire control system and a supervisory control system that the position of each device controlled by direct wire is automatically transmitted by the supervisory system from an operating dispatcher's office to a supervising dispatcher's office.

Still another object of my invention is to provide a supervisory control system of the code-impulse type which is self-checking.

A still further object of my invention is to provide a supervisory control system in which an individual code is assigned to each device or operating unit in a power system.

Still another object of my invention is to provide a supervisory control system which may be applied readily to power systems having any predetermined number of operating devices to be controlled and supervised.

Other objects of my invention will be explained fully hereinafter or will be apparent to those skilled in the art.

Figure 10:
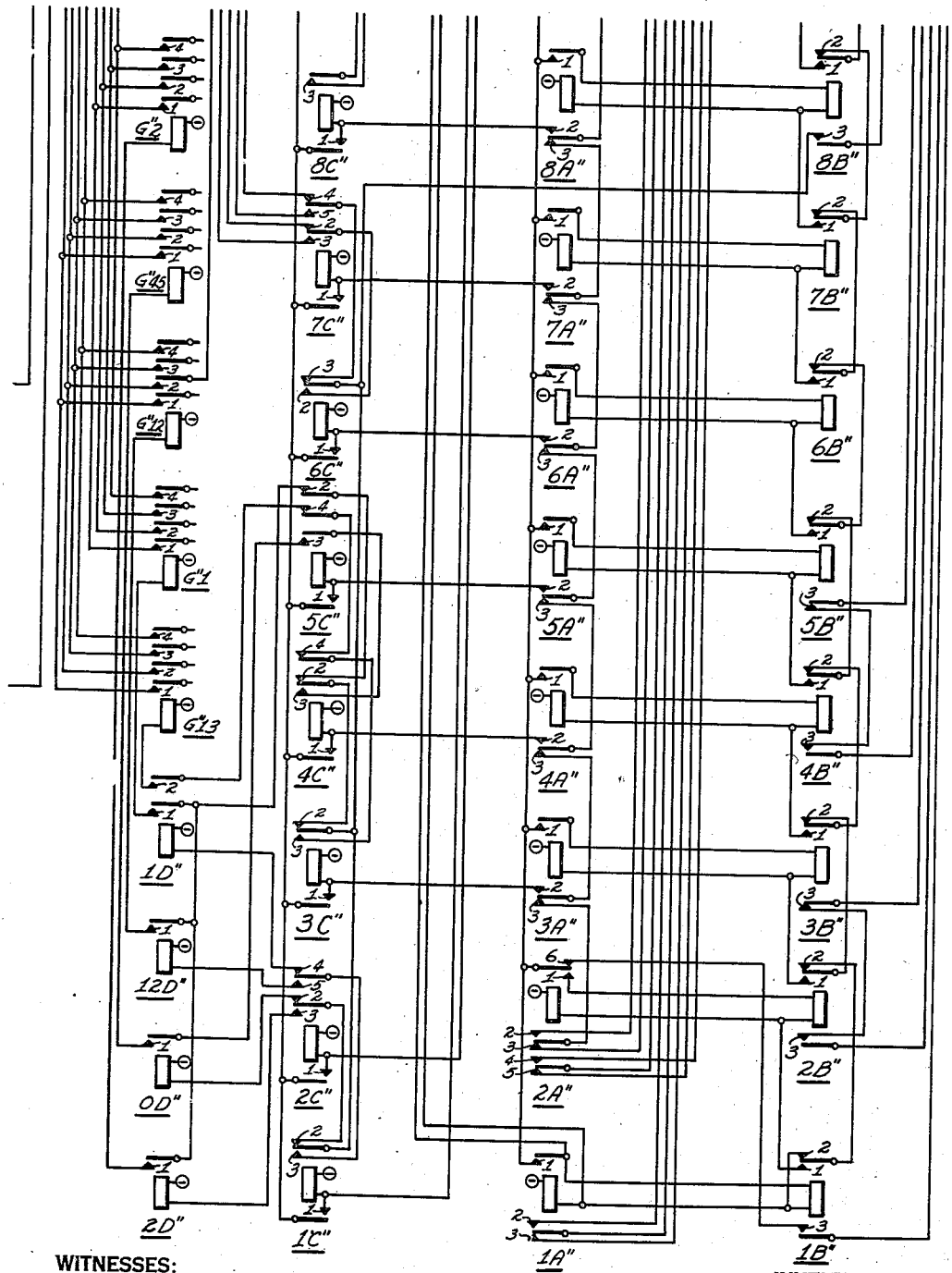
Figure 11:
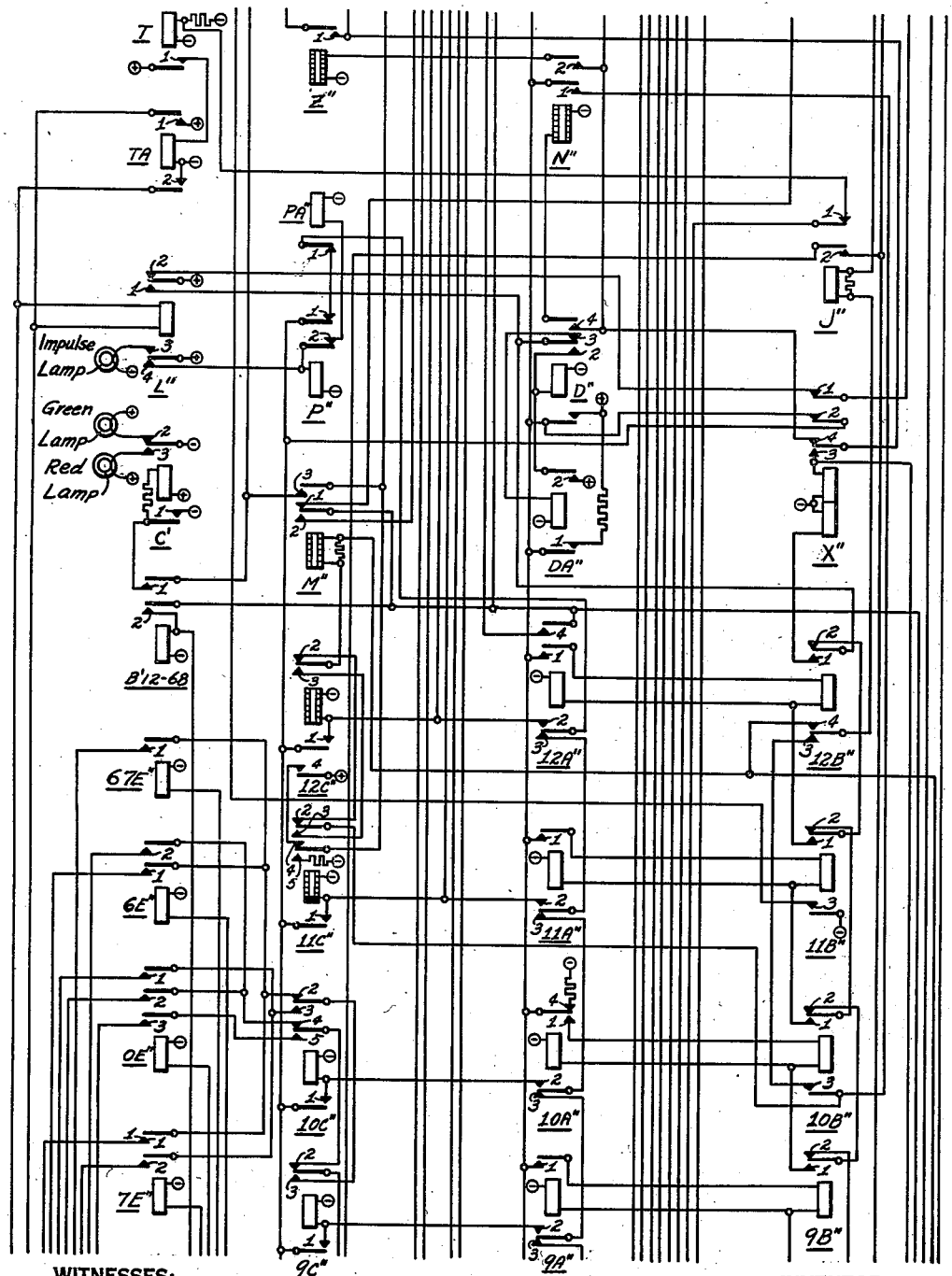

For a fuller understanding of the nature and objects of my invention, reference may be had to the following detailed description, taken in conjunction with the accompanying drawings, in which:

Figures 1 to 5, when combined, constitute a diagrammatic view of the apparatus and circuits utilized at the dispatcher's office;

Figs. 6 to 9, when combined, constitute a diagrammatic view of the apparatus and circuits utilized at a substation;

Figs. 10 to 12, when combined, constitute a diagrammatic view of the apparatus and circuits utilized at the supervising office;

Figs. 13 to 18, taken separately, are diagrammatic views illustrating fundamental elements of the circuits utilized in the supervisory control system.

The system described herein is a combination of carrier current and supervisory control, where the carrier current acts as the transmission medium for the supervisory. The present system was designed to control the operation of the circuit breakers, disconnect switches, and ground switches of a large power system comprising a generating station, a pair of transmission lines for transmitting power from the generating station to a distributing substation and a number of intervening substations located along the transmission lines. However, it will be understood that the system herein described may be applied readily to any power system. The apparatus illustrated comprises the dispatcher's equipment which is located at the generating station, which will be referred to as station B, the equipment for a substation, and the equipment at a supervising office, which will be referred to as L. A. and which is connected to the substation by direct wires.

The carrier-supervisory is coupled to one phase of one of the transmission lines and to a different phase of the other transmission line, and is arranged to operate with either line grounded or opened in any one given section of this transmission line.

The carrier-supervisory as applied to this system is designed to provide a centralized control at station B, giving complete control and supervision of all the breakers, disconnects, and ground switches in the power system. In addition, the present system is devised to automatically operate a system diagram board at the supervising office L. A. This means that the position of each device or operating unit in the power system is accurately indicated by means of red and green lamps arranged in a system diagram at L. A.

Coupled to this equipment is a direct-wire control system for the control of a switching station located near the generating station B, which will be referred to herein as B. Y. This system provides an independent means of controlling and supervising the switchyard devices, and is so arranged that the position of each device at B. Y. is automatically transmitted by the carrier-supervisory to the supervising office at L. A.

A unique feature of this equipment is the fact that the dispatcher at station B can tell at a glance whether or not the supervising board at station L. A. has received the signals correctly. Thus, with this equipment, the system dispatcher at station B is able to control the entire transmission line from station B to station L. A., and the dispatcher located at station L. A. is apprised at all times of the position of each and every device at all switching stations.

The design of the present system differs from other forms of supervisory control in that the selection and operation codes are made up of long and short pulses. In the present system, a total of ten pulses, four of which are long, is transmitted at all times in making a selection. The position of the long pulses in any given code distinguishes it from all other codes. For example, in the code 24—67, the second, fourth, sixth and seventh impulses are long, while the first, third, fifth, eighth, ninth and tenth impulses are short. In this code the first part 24 sets up a group division, while the second part 67 of the code determines the point.

With a circuit design of this kind, a great many code combinations are possible and it provides a rapid and positive means of selection, because if more than ten or less than ten impulses are transmitted, no selection can be made. At the same time, unless the short and long pulses appear in their proper time and place in a given code, no selection is made. Thus, separate independent codes are definitely established for the selection of a given device in the power system. For common functions, such as close, trip, supervision, L. A. check and release, a group of codes common to all points is used. These are:

| Operation | Code | Function |
| --- | --- | --- |
| Close | Long short short | Closes a selected breaker. |
| Trip | Short short long | Trips a selected breaker. |
| Close supervision | Long short | Indicates closed breaker. |
| Trip supervision | Short long | Indicates tripped breaker. |
| L. A. check | Short short | Indicates correct reception at L. A. |
| Office close check | Long short | Indicates red lamp lighted. |
| Office trip check | Short long | Indicates green lamp lighted. |
| Office release close check | Long | Indicates red lamp lighted. |
| Office release trip check | Short | Indicates green lamp lighted. |

At the dispatcher's office provision is made for a control key and a set of indicating lamps for each device at the remote stations for which the supervisory control has been provided. Associated with these lamps and keys, by which their operations are controlled, are groups of small multi-contact relays mounted on the dispatcher's control and relay board. A similar installation of multi-contact relays is made at the substations. At the substations, however, the relays which are controlled by the operation of those at the dispatching station are connected through their contacts to energize or deenergize auxiliary interposing power type relays, which relays in turn cause the devices in the remote substations to function in response to the operations initiated by the dispatcher.

The function of the interposing power type relays at the remote substations is to relay the signals from said station supervisory relay panel to the power equipment being controlled and supervised. The interposing power relays are designated by the symbol SG.

For each piece of apparatus remotely controlled and supervised, there is provided on the dispatcher's board a small white selection lamp; a small, white with black dot, disagreement lamp; a large red lamp; a large green lamp; a twist type control key; and a pull-push type selection key.

The small white selection lamp, when lighted, is used to inform the dispatcher that the supervisory control equipment has completed the selection of that particular unit and that the equipment is ready for further operation. The small white selection lamps are energized under the control of the selection relays at the dispatcher's office. When one of these lamps flickers, it indicates a failure in the reception of the L. A. check.

The small white, with black dot, disagreement lamp, when lighted, is used to indicate to the dispatcher that the setting of the individual twist type control key disagrees with the position of the apparatus unit at the station. For example, assume the dispatcher has operated the individual twist type control key to the close position and has closed a circuit breaker, and this breaker opens due to the operation of protective devices at the remote station, the disagreement lamp will then be lighted in addition to the green supervisory indicating lamp to inform the dispatcher that the particular unit has undergone a change and that the setting of the control key and indicating lamp does not agree.

The large red lamp, when lighted, is used to inform the dispatcher that the particular apparatus unit at the substation is in the closed position.

The large green lamp, when lighted, is used to inform the dispatcher that the particular apparatus unit at the substation is in the open position.

The twist type control key affords the dispatcher the means for selecting a "trip" or "close" operation. The setting of this control key determines what operation is to be performed.

The pull type selection key, which is locking, enables the dispatcher to set the supervisory control equipment into operation to select a definite apparatus unit. Thus, the dispatcher may cause the supervisory control equipment to select any individual control and supervisory point and its corresponding apparatus unit at a remote station and rest on that selected point. The dispatcher is then free to perform an operation.

In addition, the dispatcher is provided with three master keys and one check key as follows: a master control key, a master reset key, a check key individual to each substation and a master alarm release key.

The master control key is of the push-non-lock type designated "master control." This key, when depressed, connects the selected individual control key to the operation control circuit. After the desired apparatus has been selected, the master control key must be momentarily depressed to initiate the operation of the selected apparatus unit at the remote station.

The master reset key is a non-lock type key designated "master reset." This key is associated with the release circuit and effects the release of all relay equipment.

The master alarm release key is associated with the alarm circuit. When an automatic trip operation of a circuit breaker occurs, the alarm bell is energized to notify the dispatcher that an operation is being recorded, and the bell will continue to give an alarm until the alarm release key is momentarily depressed. After the dispatcher observes the operation that has taken place, he momentarily depresses the alarm release key which releases the alarm circuit.

The check key is used to effect the checking of the position of each and every device in a given station. To obtain said supervision, the dispatcher momentarily depresses the check key.

In general, the supervisory control system herein described functions in the same manner whether the operation is that of closing or tripping a circuit breaker. Instead of the auxiliary interposing relay being operated directly by a local operator with a conventional switchboard type control switch, it is operated by the dispatcher through the medium of the supervisory control to perform the desired operation.

To close the circuit breaker, the dispatcher pulls out the individual selection key for the particular breaker that he desires to operate. Operation of the individual selection key selects for operation the station and breaker to be operated. The correct selection is automatically indicated to the dispatcher.

The supervisory equipment then comes to rest. At this time the dispatcher definitely knows that he has selected the desired breaker for operation because the individual selection lamp for that breaker is lighted. This entire selection resulted from the pulling out of one selection key, the breaker selection key.

To actually close the breaker, the individual twist type control key for that breaker is set in the closed position, after which the dispatcher depresses the master control key. This action sets the proper circuits into operation to close the proper interposing relay, thus closing the breaker. The breaker in closing causes the indicating relay which operates from the auxiliary switch associated with the breaker to change position. This action causes the individual pair of red and green indicating lamps on the dispatcher's board to change from green to red, indicating to the dispatcher that the desired operation has been completed. The equipment may then be restored to normal by replacing the selection key. The method of tripping the breaker is the same except that the twist type control key is placed in the "trip" position before operating the master control key. After a breaker has been selected, the dispatcher may open or close that breaker. If the dispatcher so desires, repeated operations of a device may be effected without reselecting the point.

In case the dispatcher has selected a given breaker in a station for operation, but decides he does not want to operate the breaker, the equipment may be readily released to normal by restoring the individual selection key to the full "in" position. The entire sequence of operation as described above is performed by means of long and short pulse combinations, automatically checked. The relay circuits employed are simple in operation, only a few relays being required for each circuit. These relays are operated at split-second speed, given positive control unequaled by any method of directing a local substation operator.

A bell alarm is provided which operates whenever a breaker is tripped by any means other than control from the dispatcher's office. When the alarm bell functions, the breaker itself is indicated to the dispatcher by lamp signals. The breaker which operated is identified to the dispatcher by the lighting of the individual disagreement lamp corresponding to that breaker.

The alarm bell functions until the dispatcher depresses the master alarm release key. The disagreement lamp remains lighted until the dispatcher either recloses the breaker or turns the individual twist type control key for that breaker to the trip position.

The control is inherently anti-pumping, only one attempt to close a breaker being possible at a time, although any number of attempts may be made at the discretion of the dispatcher. The design of the supervisory control equipment has been arranged to include interlocking circuits so as to be inherently anti-pumping, independent of the control circuits of the circuit breaker itself, which may or may not include anti-pumping devices. Thus, when a breaker is operated by the supervisory control, it is protected against pumping even though anti-pumping devices are not installed in the control circuits of the breaker. The anti-pumping supervisory circuit is provided to prevent reclosure of a breaker by the dispatcher after he has once closed the breaker and it has tripped out automatically due to action of its protective relays. If the dispatcher deliberately desires to attempt a second reclosure, it is necessary for him to first release the master control key, place the twist key in the trip position and then back to the close position. He may then press the master control key a second time.

In order to provide protection against the possibility of a false operation of any remotely controlled apparatus through the application of foreign voltages which may be imposed on the transmission line wires from external sources, such as induction from adjacent high tension lines, electrified railway lines, or lightning, two different operation control combinations are provided for the complete control of an apparatus unit. One combination is used to close the breaker, while a different combination is used to trip the breaker. This circuit makes it necessary for the proper combination to be transmitted from the dispatcher's office and correctly received in the remote station in order to close or trip a selected apparatus unit. The operation of closing or tripping a selected apparatus unit is accomplished after selection by the operation of the master control key. The particular combination which is transmitted to the remote station is predetermined by the setting of the twist type control key and is automatically transmitted when the master control key is depressed.

The general scheme of operation is described in the following: To operate a circuit breaker, the dispatcher first pulls out the individual selection key for the breaker which he desires to operate. This action causes the office transmitting relay to set up and place on the lines the predetermined selection code. Each selection key has assigned to it and controls a predetermined selection code.

A predetermined point selection code is transmitted from the dispatching office to all substations. The function of this code is to select for operation the breaker in that substation corresponding to the individual selection key pulled out by the dispatcher, all other stations lock out. Each individual selection key on the dispatcher's board has associated with it an individual point relay combination. Each point relay combination in turn controls a certain predetermined code, which is automatically sent out by the transmitting relay at the dispatcher's office when a given individual selection key is operated.

If several individual selection keys in the same group are operated in succession, the equipment will transmit only one code, since each key opens the circuit to the next point guard relay in a given group. If several selection keys in different groups are operated, the equipment will not operate and the keys must be restored to normal and only one key operated.

At the selected station and the supervising office L. A., when the receiving relays have registered the selection code from the dispatcher's office, to select the desired breaker, this particular code results in the energization of the breaker selection relay corresponding to that breaker. This action results in the energization of the substation breaker selection relay in line with the above sequence of operation. The operation of the individual selection key at the dispatcher's office caused the proper code to be sent out to energize the substation breaker selection relay and a corresponding selection relay at L. A.

The operation of the selection key thus sets up circuits to place carrier on the lines and to so impulse this carrier that a total of ten impulses, four of which are long, are transmitted to all stations. Only that station which recognizes the code and L. A. remain unlocked while all other stations, although receiving the impulses, are locked out and cannot record a selection during the period of lockout.

When the breaker selection code is completed and if the total number of impulses is ten with the four long pulses appearing in their proper place, the point selection relay at the office, the selected station and L. A. is selected.

The point selected at a given station now sets up circuits to transmit a check code, which code is received and recorded at the office and L. A. This check code performs a two-fold function. It checks the point and lamp indication at the office and at L. A. The receipt of this code by the dispatcher's office equipment causes the individual point selection lamp to light, and at L. A. sets up circuits to permit L. A. to send its check code. The check code from the selected station is a long-short if the breaker is closed, and a short-long if the breaker is tripped. The check code from L. A. is at all times two shorts.

The equipment at L. A. now transmits two short impulses which are recorded at the selected substation and the dispatcher's office. If correctly received at the office, the point selection lamp will burn steady; if not correctly received, the point selection lamp will flicker.

At this time, the supervisory control equipment comes to rest awaiting further action on the part of the dispatcher. The dispatcher at this time knows he has selected the desired breaker in the station because the individual selection lamp corresponding to that breaker is lighted. To close or trip the breaker the dispatcher now sets the individual twist type control key in the position corresponding to the desired operation. To actually perform the breaker operation, the dispatcher now depresses the master control key.

At the completion of the last code from the station, the dispatcher is ready to complete his operation. Assume the dispatcher sets the individual twist type control key in the "close" position. This causes the dispatcher's transmitting relay to send out a close code which is registered by the selected station's receiving relays and in turn causes the "close" interposing relay to energize, thus causing the power circuits to close the breaker, but L. A. records this code without further action.

The closing of the breaker changes the position of its auxiliary switch, which in turn changes the position of the indicating relay, a relay of this type being individual to each point at the substation. When the code sent and received for closing the breaker was completed, the substation receiving relays operated to set up a code corresponding to the one placed on the line by the transmitting relays at the dispatcher's office to change the position of the dispatcher's individual point lamp relays for the selected breaker, thus causing the indicating lamp to change from green to red at the office and L. A. and completing the entire operation. At the completion of the operation, the supervisory control equipment rests on the selected point as long as the individual selection key remains in the full "out" position.

The operation of tripping a breaker is the same except that a trip code is transmitted to energize the "trip" master interposing relay, and the reverse code is sent back to change the indicating lamps from red to green. It will be noted that while different selection codes are used for the proper breaker selection at the station, a distinct "close" code is used for all closing operations and a distinct "trip" code is used for all tripping operations, after a given breaker has been selected for operation.

To summarize the above sequence of operation, it will be noted that each complete operation consists of sending different codes for each operation to be performed. The codes and resulting operations are tabulated in the following:

1. The dispatcher pulls out the individual selection key for the breaker to be operated.
2. A code is placed on the line selecting the point at the dispatcher's office, at a given station and at the supervising office at L. A. All other stations lock-out.
3. The selected substation places a check code on the line, the code depending upon the breaker position. This code is received at the office and L. A.
4. L. A. transmits a check code which is received at the office and the selected station.
5. Twist key is placed in either the "close" or "trip" position and the master control key operated. This action places the operation control code on the lines to cause a breaker operation.
6. Breaker operating sends a code to change the lamps at the office and L. A.

Before proceeding with a detailed description of the operation of the system, an explanation of the basic elements of the supervisory control circuits utilized in the system will be made, as it is believed that such an explanation will aid in the understanding of the operation of the complete system.

In Figs. 13 to 18, the circuits are divided into their fundamental parts, and for the purpose of description, various guard circuits forming a part of the complete system are eliminated from these figures.

Fig. 13 is an outline of the line circuit between the dispatcher's office and any one outlying substation. The coupling to the transmission line is accomplished by the use of capacitors. All stations controlled are similarly coupled and so are in a position to receive carrier impulses. Thus, a simple line circuit is used consisting of a line relay L, a receiver relay RR, and a keying relay KR. The keying relay acts as a means for starting the carrier which is not only placed on the line, but is also received by its own receiver. In this way, all receiver relays, including the initiating receiver, operate to close a circuit for the supervisory line relay L. The latter operates in response to the carrier to bring about a definite result.

If it be assumed that the S contact is closed by an operator, it will be seen that the closing of this circuit will result in the simultaneous energization of all receiver relays RR and L relays connected to the system. These relays will respond to short and long impulses as keyed by the operator. Here, then, is a means of transmitting intelligence from one point to a number of remote points. Instead of an operator, however, a simple circuit is provided to originate the impulses.

Fig. 14 outlines schematically the impulsing circuit. It will be observed that when the circuit to the keying relay KR is closed by closing the S contact, this relay will energize to effect the pulling of the receiver relay RR, and the latter will pull the L relay. Relay L will, in turn, open the circuit to the keying relay, which in dropping results in the de-energization of the receiver relay and the line relay, the latter will again complete a circuit to the keying relay and so this action will continue as long as the contact of S remains closed.

Relay D shown in this circuit is a slow-releasing relay and is used to complete a circuit to the counting relay and various other groups. Relay P is an extra slow-releasing relay and drops to denote a long impulse. This round-robin circuit, therefore, places short impulses on the line. Further, circuits are incorporated to convert these impulses into long impulses where desired. Therefore, a code set-up circuit is needed to tell the equipment just how the impulsing should proceed.

Fig. 15 is a simple, single-code set-up circuit for code 12—67. The code indicates the position of the long pulses in the total of ten impulses transmitted. This figure shows code set-up relays 12 and 67, a starting relay Y and sending relay S, as well as the selection key for 12—67. The operation of the selection key places code relays 12 and 67 in series followed by the operation of the starting relay Y. Relay Y completes the circuit to sending relay S, and, as seen from Fig. 14, initiates the transmission of a train of impulses. These impulses are so recorded on a counting chain that the equipment knows where and when the long impulses shall appear in the code.

Fig. 16 outlines the counting chain with the sending and impulsing circuit. This group of relays counts all impulses, including the longs, and is a means of determining the total number of impulses transmitted. In this circuit, line relay L pulls to energize relay 1A through the break contacts of relays 12B to 1B, inclusive. Relay 1A prepares a circuit for the pulling of 1B in series with 1A. As soon as the line relay drops, relay 1B pulls and so transfers the impulse circuit to relay 2A. This relay, in turn, prepares a circuit for 2B, etc., until relays 10A and 10B pull in series to complete the selection.

If more than ten impulses are recorded, a circuit is set up to effect a lock-out. In this manner, a means is established for recording all impulses. It, therefore, becomes necessary to distinguish the long impulses, so a long impulse control and recording circuit must be provided.

Fig. 17 illustrates the long pulse control and recording. The manner in which the code set-up relays 12 and 67 were energized and how all impulses were recorded by the relays 1A, 1B, etc., has been explained. The code indicates that pulses 1, 2, 6 and 7 must be long. The impulsing having started, relays P and S are energized and a long pulse circuit is immediately established from make of 12 through breaks 1B to 10B, to the keying relay KR. The relay KR is, therefore held energized until P opens. As shown in Fig. 16, relay P is normally operated over the break contact of L, and relay P being slow-releasing, does not drop during short pulses. The latter dropping completes a circuit to 1C. The first long pulse is recorded. The impulsing proceeds until 1B and 2A are energized, and again the keying relay is held energized until P drops to energize 2C to record the second long pulse. In a similar manner, the impulsing continues until 6C and 7C are energized to record the sixth and seventh long pulses, and until ten impulses have been transmitted, at which time the pulsing stops to effect the selection of the point corresponding to the code 12—67. The long pulses having been definitely isolated, it now remains to set up the selection circuit.

Fig. 18 illustrates the selection circuit which is effective at the end of the tenth pulse. The group relays energize at the end of the eighth pulse. As the impulses continue and relay 8B energizes, a circuit is immediately set up to energize 12D, G12 and 67E since long impulse recording relays 1C, 2C, 6C and 7C are energized. Relay 12D pulls because 1C and 2C are up, and relay 67E pulls because 6C and 7C are up, while relay G12 pulls because 12D is pulled, and long pulse recording relays 3C, 4C and 5C are not pulled. On the other hand, relay B12—67 is pulled on the tenth pulse because G12 and 67E are pulled and long pulse recording relays 8C, 9C and 10C are not pulled.

A relay J, contacts of which are shown in this circuit, pulls on the completion of the tenth pulse in series with the counting chain to hold the same energized until after the point has been selected. (See Fig. 16.)

The foregoing simplified circuits illustrate the fundamentals of the system for a selection from the dispatcher's office. The recording and impulse check from L. A., as well as an automatic operation from any one or more substations, is quite similar and has been generally covered in the foregoing explanation.

LIST OF RELAYS

The following is a list of the more important relays and their functions:

RELAYS AT OFFICE

| Relay | Function |
| --- | --- |
| A, E | Release pulse control relays, operate from point selection keys and control transmission of release pulse when key is restored. |
| D | Holding relay, operates from line relay and holds counting relays. |
| J | Selection control relay, operates after a selection code has been transmitted or received and controls operation of point selection relay. |
| K | Switching relay, operates from point selection relay and prepares for operation control. |
| L | Line relay. |
| M | Supervision receiving relay, operates when a supervision code is received on dispatcher operation and prepares control circuits for lamp relay C. |
| N | Auxiliary holding relay, operates from relay D and holds counting relays until received code has been registered, provided correct code is received. |

| Relay | Function |
|---|---|
| P | Code pulse receiving relay, releases on long pulses and controls code selecting relays 1C–10C. |
| Q | Code pulse transmitting relay, operates from relay P and makes long pulse somewhat longer than releasing time of relay P. |
| R | Check relay, operates when check code is received from substation, lights point selection lamp and prepares operation control circuits. |
| S | Transmitting start relay, operates when pulses are to be transmitted and prepares transmitting circuits. |
| KR | Transmitting relay, operates from S under control of line relay L and code set-up relays and applies power to the line. |
| RR | Receiver relay, operates in response to carrier impulses. |
| U | Supervision check relay, operates on automatic supervision from substation when correct selection and supervision code has been received and controls transmission of release pulse. |
| V | Release control relay, operates when point selection key is restored and controls transmission of release pulse. |
| W | Closed supervision relay, operates on dispatcher's operation when closed supervision code is received and controls lamp relay C. |
| X | Lockout relay, operates when too many pulses are received and locks out office. |
| Y | Start relay, operates when point selection key is operated. |
| Z | Master control relay, operates from master control key to prevent repetition of control code when master key is operated too long. |
| AL | Alarm relay, operates on automatic supervision from substation. |
| LA | L. A. alarm relay, operates on failure of check code from L. A. and causes flashing of point selection lamp by flashing relays FL and FR. |
| 1A–12A | Counting relays, operate when line relay closes. |
| 1B–12B | Counting relays, operate when line relay opens. |
| 1C–12C | Code receiving relays, operate on long pulses and set up selection and supervision. |
| 1, 2, 12, 13, 45 | Set up relays for group code, operate from point selection key and set up group code, at the same time preventing mutilation of codes when several point selection keys are operated. |
| 68, 78, 80, 89 | Set up relays for point code, operate from point selection keys when point code contains two long pulses. |
| G1, G2 | Group selection relays for groups with one long pulse. |
| G12, G13, G45 | Group selection relays for groups with two long pulses. |
| 1D, 2D, 12D, OD | Auxiliary group selection relays. |
| 6E, 7E, 67E, OE | Auxiliary point selection relays. |
| B | Point selection relay. |
| C | Point lamp relay. |

RELAYS AT SUBSTATION

| Relay | Function |
|---|---|
| A', E' | Supervision starts relays, operate under control of breaker on dispatcher operation and control supervision code. |
| D', J', K', L', M' | Similar to office. |
| | Operation control relay, operates from control code and controls breaker. |
| N', P', Q' | Similar to office. |
| R' | Release relay, operates when single pulse is received and releases substation. |
| S', KR', RR' | Similar to office. |
| U' | Supervision switching relay, operates after transmission of automatic supervision from substation and prepares reception of release pulse. |
| V' | Supervision check relay, operates on check and release pulse from office, operates point start relay H and releases substation. |
| W' | Supervision stop relay, operates after supervision code has been transmitted to restore point start relay H. |
| X', Y' | Similar to office. |
| 1A'–12A', 80', G'1, OE'. | 1B'–12B', 1C'–12C', 2', 12', 13', 45', 68', 78', 80', G'12, G'13, G'45, 1D', 2D', 12D', OD', 6E', 7E', 67E', similar to office. |
| F, G, H | Point selection, supervision and start relays. |
| TL, RLA', TLA, RLD, RLC. | Repeating relays, provide means for converting carrier impulses into direct current impulses and vice versa. |

DESCRIPTION OF OPERATION

The operation of the supervisory control may be followed by reference to the schematic diagram shown in Figs. 1 to 12, inclusive. Figs. 1 to 5 when laid end-to-end constitute the diagram for the equipment located at the dispatcher's office; Figs. 6 to 9 constitute the diagram for the equipment located at a substation; and Figs. 10 to 12 constitute the diagram for the equipment located at the supervising office L. A.

OPERATION BY DISPATCHER

*Code set-up*

When the dispatcher operates a point selection key, for example the key 12—68, a circuit is closed from negative through the winding of the relay 68, the normally opened contact of the selection key which has just been closed, the normally closed contacts of the selection keys for the points 12—89, 12—78, and 12—80, winding of relay 12, a rectifier, break contacts of group guard relays 1, 2, 45, 13 and 12, break contacts U—5, A—1, K—5, break contacts X—5 and RL—1, to positive. Relay 12 operates closing a locking circuit for itself over its second winding and contact 12—2, opening the positive circuit to all other group guard and point guard relays and applying positive through relay Y and contacts 12—1 to relay 68. Relay 12 also closes circuits to make the first and second pulse long. Relay 68, which is operated from direct positive through the coil of relay Y over make of relay 12 as just described, closes circuits to make pulses 6 and 8 long. Relay Y pulls in series with 68 and starts the set.

*Guard circuit*

It will be seen that only one group guard relay and only one point guard relay in the group determined by the operated group relay can be operated at a time, even though several point selection keys may be operated at the same time. While this feature is not absolutely necessary in the dispatcher's office, since the dispatcher can be instructed to operate only one point selection key at a time, it is required at the substation, and for the sake of uniformity, the office circuit is made the same as the substation circuit.

Assuming that several point selection keys are operated at the same instant, more than one group guard relay may operate momentarily, but the first relay in the order 12, 13, 45, 2 and 1 which operates opens the positive circuit to all other group guard relays, so that only one of them can remain operated over its locking winding. The selection keys of each group are wired in series, and positive is applied only to the keys of the group corresponding to the operated group guard relay, so that a circuit is completed to only one point guard relay. The rectifier units shown in the diagram are provided to prevent sneak paths when several keys are operated at the same time.

The selection code is set up by the operated group and point guard relays, the numbers of these relays indicating which pulses are made long when the relay operates. Group 2 requires point codes with three long pulses. This is accomplished by the second windings of the point guard relays which are placed in series with the first windings when a selection key in this group is operated. For example, when key 2—890 is operated, the circuit is from positive through coil of Y over make 2—1, the selection key 2—890, windings of relays 89 and 80 in series to negative. With relays 89 and 80 both operated, pulses 8, 9 and 10 are made long.

*Starting transmission*

When relay Y pulls, a circuit is closed for start relays S and SA from positive over breaks L—2, RM—2 and X—3 make Y—2, break 1A—2 and the coils of S and SA in parallel to negative. Being carried through a break of the line relay L, this circuit for S and SA is effected only as long as the line relay is normal, so that a pulse received from the substation at the same time that the circuit for S and SA is closed will prevent the operation of S and SA.

The relay SA closes a circuit for keying relay KR from positive over breaks L—2, RM—2 and X—3, make SA—2, breaks K—4, 10A—5, breaks J—1, W—1 and a rectifier unit to the winding of the relay KR, and thence to negative. When KR operates, it applies carrier to the line, thereby operating the receiver relays RR of the office and all substations and in turn their respective line relays L.

*Pulse circuit*

When L operates, it opens the circuit for KR. Neglecting for the time being the sending of long pulses, KR will release shortly after L pulls. The release of KR in turn removes power from the line, thereby dropping all RR and line relays L. The release of L again closes the circuit for KR and the same cycle of operation is repeated, KR pulling, RR and then L pulling, thereafter KR dropping, RR and then L dropping, resulting in the transmission of a series of impulses over the line, until the circuit of KR is opened by break 10A—5 during the tenth pulse.

As soon as L—2 pulls, the operating circuit for S and SA is opened by break L, but S and SA lock over make 1A—3 make S—1, and D—1 to positive. The contacts of 1A in this circuit are adjusted "make before break" so that relays S and SA are permitted to lock in. At all other stations, the circuit of S and SA is open as soon as line relay L pulls and thereafter held open by break 1A so that S and SA cannot operate at these stations while pulses are being received.

*Counting circuit*

The pulses are counted by counting relays 1A to 12A which pull in sequence when the line relay L closes, and 1B to 12B which pull in sequence when the line relay L releases. The first operation of L pulls DA from positive over make L—1, break W—4, break D—4 and the winding DA to negative. The relay DA in turn pulls D through contacts DA—2, and the winding D to negative, and also pulls N through contacts D—3 and the winding N to negative. The relay D closes a holding circuit for the counting relays. The relay D is slow-releasing and does not drop between pulses. The function of the combination of the relays D and DA is to provide a fast closing of the circuit for the counting chain and a slow opening of this circuit. When L operates in response to the first pulse, it closes a circuit for 1A from positive over make L—1, break W—4, breaks 12B—2, 11B—4 to 1B—4 of the counting relays, and winding 1A to negative. The relay 1A closes a locking circuit for itself over the winding of 1B and contact 1A—1, through D—1 to positive. As long as L is operated, 1B is shunted over make L—1 and cannot operate.

When L releases after the first pulse, the shunt across 1B is opened and 1B pulls in series with 1A from positive over make D—1 or DA—1, make 1A—1 and windings 1B and 1A to negative. The relay 1B transfers the pulse counting circuit from 1A to 2A so that 2A pulls when L operates in response to the second pulse. The relay 2A closes a locking circuit for itself over the winding of 2B, but 2B is shunted by make L and cannot pull until L drops after the second pulse. The relay 2B transfers the counting circuit to 3A and the following pulses are counted in a similar manner by relays 3A, 3B, etc.

*Control of long pulses*

For selection purposes, four of the pulses must be long. This is accomplished over the code set-up circuit including a second path through another rectifier unit to the relay KR. To transmit code 12—68, pulses 1, 2, 6 and 8 must be made long. As soon as S and SA pull, a second circuit is closed for the second path to KR from positive over make 12—4, breaks 1B—2 to 12B—1, makes P—2, and SA—1, and thence through the rectifier unit, to the winding of KR. Relays P and PA are normally operated over the break contact L—2, and relay P being slow-releasing does not drop during short pulses. The relay P in turn pulls the relay Q through its contacts P—4. As a result of the circuit closed for the second path to the winding of KR, it does not drop immediately when the first path is opened by the operation of L, but remains operated for the time being.

Power is thereby kept on the line and all line relays L remain pulled. After a predetermined interval of time, the slow-releasing relay P, whose circuit is opened by L, drops and opens the circuit of the slow-releasing relay Q, which also drops after a certain interval. When Q drops, the circuit of the second path to the winding of KR is opened and KR drops, removing power from the line and dropping RR and L. The relays P and PA provide a fast closing and slow-releasing circuit.

*Code relays*

When P drops, it operates a code relay 1C from positive over make D—1, break X—1, breaks P—5, PA—2, breaks 12A—2, to 2A—4, break KA—6, and the winding 1C to negative. The relay 1C locks over make 1C—1, break X—1, and make D—1 to positive. This takes place at the sending station and all the remote stations, so that the first pulse being long results in code relays 1C being operated at all stations. The duration of the long pulse is increased by the dropping time of relay Q in order to give the remote stations sufficient time to pull 1C and to take care of inequalities in the dropping time of relays P at the various stations.

As described above, the relay 1B pulls at the end of the first pulse, transferring the circuit for the second path of KR to other contacts of the code set-up relays. In the present case, a new circuit for the second path of KR is prepared from positive over makes 12—5 and 1B—1, and breaks 2B—2 to 12B—1, which becomes effective as soon as P and Q pull after the release of L at the end of the first pulse. This makes the second pulse a long one, resulting in the operation of code relays 2C at all stations. The circuit for the winding of 2C extends through the make contacts P—5, PA—2 and break contacts 12A—2 to 3A—2, inclusive, make 2A—5, break KA—4 and the winding 2C to negative. The relay 2C locks over its contacts 2C—1 in the same manner as the relay 1C.

At the end of the second pulse, 2B pulls and opens the circuit for the second path of KR. During the third, fourth and fifth pulses, no circuit is completed by the code set-up relays for the second path of KR. After the fifth pulse, 5B pulls and closes a circuit for the second path of KR from positive over makes 68—1 and 5B—1, breaks 6B to 12B, and makes PA—1 and SA—1 as previously described, thereby making the sixth pulse long and operating code relays 6C at all stations. In a similar manner, the eighth pulse is made long by a second path to the winding of KR over makes 68—2 and 7B—1, causing the operation of code relays 8C at all stations. No circuit is completed for the second path of KR during the seventh, ninth and tenth pulses, so that these pulses are short.

When L pulls in response to the tenth pulse, the operation of 10A opens the circuit for the first path of KR so that no further pulses can be transmitted.

*Point selection*

The relay D, receiving no further pulses from the line relay L, releases after a short interval and opens the original holding circuit for the counting and code relays. However, if ten pulses have been transmitted, these relays are held over make contact N—1, the winding of a relay J, make 10B—5, break BY—8, make 10A—4, break K—4, make SA—2, and breaks X—3, RM—2 and L—2, to positive. The relay J pulls over this circuit and closes a circuit for the point selection relay B—12—68, the point corresponding to the selection registered on the code relays.

In the present case, code relays 1C, 2C, 6C and 8C are operated. The point selection circuit is prepared after the eighth pulse by 8B pulling and closing circuits for one of the group selection relays and one of the relays 67E, 6E, 7E, or 0E as follows: for the relay 12D from positive over breaks RL—1, X—5, K—1, make 8B—5, 1C—2, 2C—2 and the winding 12D; for the relay G12 from positive over breaks RL—1, X—5 and K—1, make 8B—5, breaks 3C—2, 4C—2 and 5C—2, make 12D—1 and the winding of G—12; for the relay 6E from positive over breaks RL—1, X—5, K—1, makes 8B—5 and 6C—2, break 7C—3 and the winding of 6E.

Now, when J pulls after the pulses stop, point selection relay B12—68 is operated from positive over breaks RL—1, X—5, and K—1, make J—2, make 8C—2, and break 9C—2, break 10C—2 and make 6E—1, make G12—2, and the winding of B12—68. The relay B12—68 pulling extends its operating circuit to the relays K and KA, through its contact members, which also pull, closing a locking circuit for themselves through the break contacts RL—1, X—5 and make contact K—2, and the break contact BY—2. The operation of the relay K opens the pulling circuit for the point selection relays so that no more point selection relays can be operated, and it also opens the holding circuit for the counting and code relays and for relays J, S and SA. All these relays release and the transmitting, counting and code circuits are thereby restored to normal.

*Key holding circuit*

At the same time, K pulling after the tenth pulse opens the circuit of the group relay 12, which drops, in turn releasing 68. After D drops a new circuit is closed for 12 and 68 in series with the relay A, from positive through breaks RL—1, X—5, the winding of relay A, breaks D—5, A—1 and U—5, breaks 12—3, 13—3, 45—3, 2—3 and 1—3, the rectifier unit and the winding 12, the selection keys and the winding of 68 to negative. The resistance of the winding of the relay A is of such a high value that the relays 12 and 68 do not operate at this time. The relay A, however, operates over the make of key 12—68 and serves to hold the selection until the key is restored to normal. The relay A also pulls the relay E from positive through breaks RL—1, X—5 and make K—2, make A—4 and the winding of E, thereby establishing a locking circuit for the relay A over makes E—1 and N—2, to prevent the release of the set while pulses are being received from a substation.

The relay KA switches the code receiving circuits for pulses 1 and 2 from code relays 1C and 2C, to code relays 11C and 12C so that henceforth 11C and 12C are operated when the first or second pulse is long.

*Selection complete*

At this stage, the office has completed the selection of a point and is ready to receive the check code from the substation. The release of D has opened the circuit of the slow-releasing relay N, which holds up for a predetermined interval, and the check code from the substation must start before N releases.

*Safeguard of codes*

Before taking up the functions at the substation in response to the pulses transmitted by the office, the group and point selection circuits will be explained in greater detail.

As explained above, the circuit for the point relay B is completed only if 10A has operated in response to ten pulses on the line. If less than ten pulses have been transmitted, relay D will release after the pulses cease, but 10A will not be operated so that no new holding circuit is established for the counting and code relays, with the result that these relays release immediately after D without making a selection.

If more than ten pulses are received, the eleventh pulse will operate the lockout relay X from positive over make L—1 and break W—4, breaks 12B—2 and 11B—4, make 10B—3, break BY—11, make SA—5 and the winding of X. The relay X locks over its second winding through make X—4 and break RL—1, until the set is released. The relay X also opens the locking circuit of the code relays, causing these relays to drop and opens the circuit over the break of L, so that no further transmitting can take place from the office and no selection can be made until the set is released.

Thus, it will be seen that J can pull only if ten pulses, no more and no less, are received. Relay J closes the point selection circuit, but a point selection relay can only be operated if four long pulses have been received and properly registered on four of the code relays 1C to 10C.

*Group code*

Inasmuch as the group code contains either one or two long pulses, in the first five pulses, either one or two of the code relays 1C to 5C must be operated. If there is no long pulse in the first five pulses, none of the relays 1C to 5C is operated. Therefore, no group selection relay (G1, G2, G12, G13 or G45) can pull, and consequently no point selection can be made. If only one long pulse is received in the first five pulses, one of the relays 1C to 5C will be pulled, closing a circuit for one of the group selection relays G1 or G2 when 8B operates. If two long pulses are received in the first five pulses, two of the relays 1C to 5C will be operated, with the result that a circuit is closed for one of the group selection relays G12, G13 or G45 when 8B pulls.

If three or more long pulses are received in the first five pulses, an examination of the contact circuits of relays 1C to 5C will show that no circuit will be closed for a group selection relay and so prevent subsequent point selection. In other words, a group selection relay will be operated only if either one or two long pulses are received in the first five pulses.

*Point code*

For group codes with one long pulse, the point code must contain three long pulses, while two long point code pulses are required for group codes with two long pulses, that is, the point codes contain either three or two long pulses, depending on the preceding group code. Examining the contact circuits of the point code relays 6C to 10C, it will be seen that a point selection circuit is not completed unless two or three long pulses are received in the last five pulses.

When two long pulses are received in the last five pulses, point selection circuits are prepared which lead only to those group selection relays associated with two-pulse group codes, so that in this case a point selection is made only if two long group selection and two long point selection pulses are properly received.

When three long pulses are received in the last five pulses, other point selection circuits are prepared, leading only to those group selection relays which are associated with a one-pulse group code. In other words, in this case a point selection circuit can be closed only if one long group selection and three long point selection pulses are properly received.

If four or more long pulses are received in the last five pulses, the contacts of code relays 5C to 10C cannot close a point selection circuit. Summing up, it will be seen that a point selection can be made only if relay J operated in response to at least, and not more than, ten pulses, and if either one group code and three point code relays, or two group code and two point code relays, are operated by at least four and not more than four, long pulses. In other words, a selection can be completed only by ten pulses containing four long pulses. All other combinations of pulses will not complete a selection.

*Substation counting circuit*

The pulses transmitted by the office are received not only by the line relay L at the office, but by the line relays of all substations. The first operation of L' at a substation in response to the first pulse transmitted by the office causes a circuit for relays D' and DA' to be established. The relay D' is slow-releasing and, therefore, remains operated between pulses. The pull of the relay D' operates the relay N', through the make contacts D'—3, the break contacts X'—1, and RL'—3, which in turn, pulls the relay Z' through the make contacts N'—1. The pulses are counted at the substations by counting relays 1A' to 12A' and 1B' to 12B' in the same manner as at the office, with relay D' supplying a holding circuit for them. Relay P' drops during long pulses and causes the operation of the same code relays 1C' to 10C' as at the office.

*Point selection at substation*

When the office stops transmitting after ten pulses, relays D' at the substations release after a short delay, opening the original holding circuit for the counting and code relays, but if ten pulses have been received, a new holding circuit for these relays is established over breaks L'—2, X'—4, breaks SA'—2, KA'—2, make 10B—5, the winding of J' and make N'—3, thereby operating the relay J' and pulling a point selection relay F in a manner similar to that at the office and including the same features to prevent a selection in case an incorrect code has been received.

The relay F12—68 extends its operating circuit to K' and KA', through break contacts S'—3, which pull and lock the point relay F12—68 and also K' and KA' through make contacts K'—4 and U'—2, and break contacts X'—1 and RL'—3. The relay KA' then opens the holding circuit for the counting and code relays and for J', causing these relays to release.

*Check code from substation*

As soon as counting relay 1A' has released, start relays S' and SA' operate from positive over breaks L'—2 and X'—4, make KA'—1, breaks UA—1, V'—1, 1A'—3 and CG—2 to the windings S' and SA', to negative and initiate the transmission of the check code from the substation by closing a circuit for KR' which becomes effective as soon as J' releases. The circuit for the keying relay KR' extends from positive through break contacts L'—2 and X'—4, make SA'—1, break 12A'—2, make KA'—10, break 2A'—6, break J'—1, and thence to the keying relay KR'. With S' and SA' operated, the substation transmits impulses as described above for the office by the mutual interrupting action of relays RR', L' and KR'. The selection check code transmitted by the substation consists of two pulses and serves at the same time, to indicate the present condition of the circuit breaker. If the breaker is closed at this time, a long pulse and a short pulse are transmitted, or a short pulse and a long pulse if the breaker is tripped.

Assuming the breaker to be tripped, point relay G' will be deenergized at this time, and common relay A', which is connected in parallel with G' by point selection relay F12—68, is also deenergized. As a result, the circuit for the second path of KR' is not closed during the first pulse, making it a short pulse. When 1B' pulls after the first pulse, a circuit is closed for the second path of KR' from positive over breaks Y'—1, A'—2 and make 1B'—1, breaks 2B'—2 to 12B'—1, makes PA'—1 and SA'—6, thereby making the second pulse long. If the breaker had been closed at this time, the first pulse would have been made long over break Y'—1 and make A'—1, etc., A' having pulled in parallel with G' as soon as F12—68 operates.

After two pulses, the circuit for the first path of KR' is opened by 2A', thus stopping the transmission of further pulses. At the same time, V' is pulled from positive over breaks L'—2 and X'—4, make SA'—1, break 12A'—2, makes KA'—10 and 2A'—5. V' locks over its second winding and makes V'—2 and Z'—2. The pulses having stopped, D' drops after a short period and releases the counting and code relays, thereby restoring these relays to normal and making the substation ready for the reception of the check code from L. A.

*Lamp control at office*

The pulses transmitted by the substation are received at the office, operating relays L, D, 1A, 1B, 2A, 2B, and either 11C or 12C. When D drops after the pulses stop, the original holding circuit for the counting and code relays is opened, but a new holding circuit is established for them from positive over breaks L—2, RM—2, X—3, breaks SA—3 and MA—4, the winding of the relay M, either make 12C—3 and break 11C—3, or break 12C—2 and make 11C—2, makes KA—2 and 2B—5, break 3B—5, and make N—1. It will be seen that the circuit for M is closed only if either the first or the second pulse is long. If both are short or both are long, the contacts of 11C and 12C keep the circuit of M open.

The relay M closes a circuit for controlling the lamp relay C. If the breaker was tripped, the second pulse of the check code is long, but not the first, so that 12C is pulled, but not 11C. In this case, M shunts C over makes B12—68 and M—3 and break 11C—4 and make 12C—5, thereby dropping C if it should be operated at this time. Had the breaker been closed, 11C would have pulled instead of 12C, and M would have pulled C over makes B12—68 and M—3 and 11C—5 to negative, in case C should be deenergized at this time.

The relay M also operates MA through contacts M—1, which locks over make MA—1, break V—2, make K—2, breaks X—5 and RL—1, preparing the office for the reception of the check code from L. A.

Check code from supervising office at L. A.

At L. A. the selection code transmitted by the dispatcher's office causes the operation of a point selection relay in exactly the same manner as at the substation, the point selection relay, in turn, pulling the relays K'' and KA'' which drop the counting and code relays and prepare L. A. for the reception of the check code transmitted by the substation. The latter code causes the operation of 11C'' or 12C'' and of M'' which controls the lamp relay C' in the same manner as at the office. At the same time, M'' operates W' which locks over make W'—1, break V''—3, make K''—4, break X''—4, break U''—2 and RL''—1 to positive, and drops the counting and code relays and M''. The relay W' also prepares a start circuit for the transmission of the check code, which becomes effective when relay 1A'' drops, as follows: From positive over breaks L''—2, X''—1, break V''—1, make W'—3, break W1—1, break 1A''—3 and the winding of S'' to negative. When S'' pulls, L. A. transmits two short pulses to indicate that it has received both the selection code from the office and the check code from the substation. The manner of transmission is the same as that described for the office, involving the mutual interruption in this case of relays T and L''. There being no long pulse circuit at L. A., all pulses transmitted from there are short pulses. Since the supervising office at L. A. is not equipped with carrier, the impulsing from this point is carried over a pair of metallic wires to the substation where it is converted into carrier and placed on the transmission system. After two pulses have been transmitted, relay 2A'' opens the circuit of relay T, thereby stopping the transmission of further pulses and also operating V'' from positive over breaks L''—2 and X''—1, make S''—2, makes KA''—1 and 2A''—4 to the winding of V''. The relay V'' locks over its second winding through make V''—2, break M''—1, make K''—4, breaks X''—4, U''—2 and RL''—1, and drops the relay W' in preparation for the subsequent reception of indication codes from the substation. After the two check pulses are transmitted from L. A., no further pulses are transmitted, causing D'' to drop and release the operated counting relays. This prepares L. A. for the reception of further codes.

L. A. check received at office

At the dispatcher's office, the check code from L. A. operates the line relay L, relay D and the counting relays 1A, 1B, 2A and 2B, but no code relays, both pulses being short. When the pulses stop, D drops after a short interval, closing a new holding circuit for the counting relays from positive over breaks L—2, RM—2, X—3, break SA—3, make MA—5, break MB—4, the winding of AB, breaks 12C—4 and 11C—3, makes KA—2 and 2B—5, break 3B—5, and make N—1. The relay AB operates MB, which locks through makes MB—1, MA—1, break V—2, make K—2, breaks X—5 and RL—1, and drops the counting relays and relay AB. The relay MB also opens the circuit to the L. A. alarm relay LA, and pulls V from positive over breaks RL—1 and X—5, make K—2, break V—2, makes MA—1, MB—1, MB—2, breaks U—3, R—2 and M—2 to the winding of V. The relay V locks over break M—2 and make V—3, and also pulls the relay R over make V—4. With the relays V and R operated, the locking circuit of MA and MB is opened, dropping these relays. The relay R is locked in until the set is released by restoring the point selection key. It lights the point selection lamp, over makes B12—68—3, R—4 and break LA—2, and prepares the operation control circuits.

Thus, it will be seen that the point selection lamp can light continuously only after the reception of the check codes from the selected substation and from L. A. and that the operation control circuits are ready for operation only in this case.

Failure of L. A. check

Should the substation transmit the proper check code, but for some reason the office fail to receive the check code from L. A., this will not prevent operations by the dispatcher, but the absence of the check from L. A. will be indicated to him by flashing of the point selection lamp. When the L. A. check is not received at the office, relays AB and MB will not be operated, but relay N, which has so far remained operated since the intervals during which relay D was released were not long enough, will now drop, and if MB is not operated at this time, the relay LA will pull in parallel with V over make M—1, breaks N—3 and MB—3. The relay LA locks over a second winding, through break RL—3, make LA—1 and the reset push button switch, and switches the point selection lamp from direct positive to the flashing relays FL and FR, which in turn, causes the point lamp to flash. Since the relay V pulls in this case, R also operates and prepares the operation control circuits.

At the substation, the check code received from L. A. causes the operation of AB', which in turn, pulls and locks MA'. MA' drops the counting relays and the relay AB'.

As explained above, relays N at the office, substation and L. A. normally do not drop during all these functions, since D does not drop long enough between the various codes to let N release. Now, however, a longer pause occurs and all relays N drop. If, in the meantime, the breaker has changed its position, a new indication code will be transmitted by the substation as described hereinafter.

Transmission of operation control code

The dispatcher may now operate the master control key, pulling MK and either CL or TR, depending upon the position of the twist key of the selected point. The relay MK pulls S and SA over breaks L—2, RM—2 and X—3, Z—2, either make CL—5 or TR—2, make MK—1 and break IA—2, thereby initiating the transmission of the operation control code. Relay CL or relay TR locks up until the twist key is turned to the opposite position or until the selection is released, thereby providing an inherent antipumping feature. The relays S and SA start the transmission of pulses, as described above. For closing the breaker, one long pulse and two short pulses are transmitted, while the code for tripping is two short pulses and one long pulse. In the first case, the first pulse of the three operation control pulses is made long by closing a circuit for the second path of KR from positive over breaks Y—1, MA—2 and Z—1, make CL—1, breaks 1B—2 to 12B—1, and makes P—2, and SA—1. For tripping the breaker, the third pulse is made long over breaks Y—1, MA—2, Z—1 and CL—2, makes TR—1 and 2B—1, and breaks 3B—2 to 12B—1 and thence to the KR relay as previously described. After three pulses are transmitted, the circuit for KR is opened by the operation of the relay 3A which opens its contacts 3A—5, and also pulls the relay Z by closing its contacts 3A—4. The relay Z locks over its second winding through make contact Z—3 and either make CL—4 or TR—4 to prevent repeating the control code until the dispatcher releases CL or TR by turning the twist key to the opposite position. After the control code is transmitted, relay D drops, releasing the counting and code relays to prepare the office for the indication code to be received from the substation.

Operation control code received at substation

At the substation, one long and two short pulses received from the office close a circuit for CL' as soon as D' drops, from positive over breaks L'—2 and X'—4, break SA'—2, make KA'—3, makes 2B'—5 and 3B'—5, breaks 4A'—4, UA—2, make RT—2, break 3C'—4, and winding of CL', make 11C'—3, and make N'—3, to the counting relays. The operation of the relay CL' energizes the relay SGC to close the breaker, the closing circuit being maintained until N' drops or until the breaker closes which operates the relays G' and A'. When the tripping code is received, the relay TR' pulls after D' drops from positive over breaks L'—2, X'—4, SA'—2 and make KA'—3, makes 2B'—5, 3B'—5, breaks 4A'—4, UA—2, makes RT—2 and 3C'—5, the winding of TR', break 11C'—2, and make N'—3. This circuit is also maintained until N' drops or until the breaker trips, thereby dropping A' and G'.

Indication code from substation

When N' drops a predetermined period after the release of D', the locking circuit for V' is opened, since relays A' and E' are either both operated (breaker closed) or both released (breaker tripped). The same is true if the breaker changes its position automatically without control by the dispatcher. In either case, V' drops and initiates the transmission of an indication code by pulling the relays S' and SA'.

The indication code is transmitted as described above for the check code from the substation, V' being pulled again after the code is transmitted. The indication code controls the lamps at the office and L. A. as described above, and L. A. follows with the transmission of its check code.

Indication check code from office

In this case, however, it is necessary to transmit a check code from the office back to the substation to indicate that the lamps have changed properly.

This is accomplished as follows: The office function is exactly as described above for the check code from the substation and L. A., except that after the check code from L. A., the relay MC is pulled instead of V, R being operated. The relay MC starts the transmission of the check code from the office, which is the same as the indication code received from the substation, the long pulse being determined by the position of relay LC, which is in parallel with the point lamp relay C, so that the code transmitted by the office indicates the actual position of the lamp relay. After the code is completed, the relay V pulls over makes 2A—2 and MC—4, and locks over its other winding as described above, also dropping MA, MB and MC.

If the check code from L. A. is not received properly, AB and MB will not be operated before N drops, so that LA is pulled as described above, starting the point lamp to flash.

Restoring substation point start circuit

At the substation the check code received from the office operates relay 11C' or 12C' and pulls M' after D' drops. M' controls the point relay H' and common relay E'. If the breaker has closed and a corresponding check code has been received from the office, 11C' is operated at this time, and as a result M' pulling shunts E' and H', causing them to drop. The relay G' remains locked over make G'—4 and the second winding of G' as long as the breaker stays closed. If the breaker has tripped, 11C' is not operated when M' pulls and, therefore, H' and E' are pulled over break UA—3, make M'—2, and break 11C'—4 to negative.

In either case, if the check code received from the office agrees with the position of the breaker, as indicated by relay G', the locking circuit for V' is maintained over break A'—5 and make E'—1 or over make A'—6 and break E'—2, so that V' remains locked after N' drops. If the code received from the office does not check or is not properly received, V' releases after N' drops and a new indication code is transmitted.

Release by dispatcher

The dispatcher may remain on the point as long as desired and repeat closing or tripping operations. Meanwhile, the breaker is supervised and any change in its position automatically indicated to the office.

When the dispatcher wishes to release the set, he restores the point selection key. If no pulses are being received at this time, that is, if N is normal, restoring the point selection key opens the circuit of A, which drops and closes the circuit for W, over make E—2 and break A—5. The contact W—2, closes a circuit for KR. The operation of KR closes L, which in turn pulls the relay RM, through makes W—3 and L—1, also opening the first path of KR.

In order to make a last check of the lamps at the office against the actual position of the breaker at the substation, the release pulse is made short when the lamp shows green and long when the red lamp is lit. In the first case, no circuit is completed for the second path of KR, LC being deenergized together with C. Therefore, L opens KR which in turn drops L. Meanwhile, RM has pulled and locked over its second winding, so that L pulls RL, which releases all common relays operated at this time and thereby restores the office to normal.

When the point lamp shows red, the functions are the same, except that the second path of KR is energized over break RL—2 and makes LC—3 and W6, thus making the release pulse long.

The relay LC pulling closes a circuit for the relay RLA, through break RM—3, make LC—3, and break RL—2. The relay RLA being a slow-releasing relay prevents resetting until it finally drops. In this way, it provides a long pulse.

At the substation, the release pulse operates D′, IA′, IB′, and if it is long, IIC′. After the pulse stops, D′ drops, completing a circuit for R′ in series with IA′ and IB′. The relay R′ in turn pulls the relay RL′, and also controls the point relay H′ and the relay E′, as described above. The contact R′—I, also short circuits IB′, which drops, opening the circuit of R′. The relay RL′ is slow-releasing and remains operated for a short period after R′ drops. During this interval, the locking circuit for all other common relays operated at this time is opened, thereby releasing the substation.

If point relay H′, after being set by the release pulse, does not agree with the actual position of the breaker, the substation at once starts to transmit a complete automatic indication to the office in the same manner as for breaker changes when the set is at rest.

AUTOMATIC OPERATION OF BREAKER

*Point start circuit*

At the substations, a point start circuit, consisting of the relays G′ and H′, is associated with each circuit breaker or other device to be supervised. Following each change in the position of a breaker, the new position is recorded on the point start relays until the corresponding indication has been transmitted successfully to the dispatcher's office and to L. A. The transmission of this new indication is not affected by any further changes in the position of the breaker which may take place in the meantime. After the new indication has been transmitted to the office and the proper check has been received, the point start circuit is again placed under the control of the breaker, ready for starting a new indication as soon as the breaker changes from the position last indicated.

The point start circuit is so arranged that either one or the other of the two relays G′ and H′ is operated when no indication is to be transmitted. When both relays are deenergized, or when they are both operated, the substation transmits an indication to the office until the normal condition is restored, that is, until either G′ alone or H′ alone is operated.

With the breaker in the tripped position, only H′ is normally energized, while only G′ is operated normally when the breaker is in the closed position. Assuming that the breaker is tripped, the relay H′ is locked from positive over winding H′ and make contact H′—3 a resistor, make contact H′—4, a break contact CG—I of the master checking relay CG to negative, the relay H′ having been operated as a result of a previous operation of the set. When the breaker closes, G′′ pulls from positive over the auxiliary switch of the breaker, winding G′, break G′—3, make H′—4 and the break contact CG—I to negative. The relay G′ locks through make G′—4 and its second winding.

When the correct check is received from the office, indicating that the lamps associated with the particular breaker involved have changed from green to red, the common equipment at the substation functions to short circuit the winding of H′, thereby causing H′ to release. If the breaker is still closed at this time, G′ remains operated over the auxiliary switch of the breaker, winding G′, make G′—4, the second winding of G′ and the break contact of CG—I to negative.

If the breaker has been tripped in the meantime, or if not, as soon as the breaker is tripped, G′ drops as a result of the opening of the breaker auxiliary switch.

When this check is received from the office, the common substation equipment causes relay H′ to operate and lock over the above-described circuit. Should the breaker have been closed meanwhile, G′ pulls as described above, starting a new indication, otherwise the point start circuit awaits the next closure of the breaker which starts the above-described train of functions. In this manner the dispatcher is always advised of changes in the position of the supervised equipment.

*Code set-up*

The relays G′ and H′ are equipped with contacts which function similarly to the contacts of the point selection keys at the office. With the point relays in either of the two normal conditions, the common start circuit is open and a circuit is carried through to the next point over make H′ and break G′, or break H′ and make G′.

When the breaker trips, G′ and H′ are both deenergized, closing the common start circuit as, for example, for point 12—68 from negative over winding 68′, breaks G′—I and H′—I, either make G′ and break H′ or break G′ and make H′ of the interposing contacts of the G′ and H′ relays, winding 12′, the rectifier unit, breaks 2′—2, 45′—2 13′—2 and 12′—2, breaks IIB′—5 and K′—I to positive. The relay 12′ pulling transfers this circuit through the coil of Y′. Closing of the breaker completes the same circuit over makes G′—2 and H′—2 instead of breaks G′—I and H′—I. In either case, the circuit to the next point is opened, so that only one point guard relay can be operated.

As a result, relays 12′, 68′ and Y′ are operated, while the operation of other group and point guard relays is prevented, as described above for the office, no matter how many points may be waiting to transmit an indication. As soon as the transmission of one indication has completed and checked, the associated point circuit is restored to normal, and the other indications which may be waiting are transmitted one by one.

*Starting transmission*

The operation of relays 12′ and 68′ closes circuits for making pulses 1, 2, 6 and 8 long, while Y′ operates the start relays S′ and SA′ from positive over break contacts L′—2 and X′—4, make Y′—2, break IA′—3, break CG—2 and the windings of S′ and SA′ to negative. The relay SA' in turn closes a circuit for the keying relay KR' from positive over breaks L'—2 and X'—4, make SA'—1, breaks 12A'—2, KA'—3 and J'—1, and thence to the winding of KR' to negative. The relay KR applies carrier to the line, operating receiving line relays RR and L at the office and all substations. From here on the transmission of pulses is the same as described above for the dispatcher's office, including the control of long pulses over a second path for KR' and the operation of the code relays 1C' to 10C' on long pulses.

Indication code

After pulse 8, relay 8C' closes circuits for the group selection and part of the point selection. After ten pulses are transmitted, the selection code is completed, but on automatic indications from the substation the selection code is followed immediately by the indication code consisting of two pulses to indicate the new position of the breaker. At the substation, the point selection relay F12—68 is operated immediately after pulse 10 from positive over breaks RL'—3 and X'—1, breaks U'—2 and K'—3, makes S'—2, 10A'—5, 8C'—2, breaks 9C'—2, 10C'—2 and make 6E'—1, make G'12—2, and the relay F12—68 to negative, but the circuit for K' is held open for the time being by the break contact S'—3. As soon as F12—68 pulls, common indicating relays A', and E', are connected in parallel with point relays G' and H', respectively, with the result that A' and E' remain deenergized when the breaker is tripped, but operate when it is closed. In the first case, pulse 11 is short, while pulse 12 is made long by a circuit completed for the second path of KR' from positive over break A'—3, make 11B'—1, break 12B'—1, makes P'—1 and SA'—6, thence through the winding KR' to negative. With the breaker closed, that is, with relay A' operated at this time, pulse 11 is made long by a circuit for the second path of KR' from positive over makes A'—4 and 10B'—1, breaks 11B'—2 and 12B'—1, makes P'—1 and SA'—6, and thence through the winding KR' to negative, while pulse 12 is short.

Stopping transmission

After twelve pulses have been transmitted, the circuit for the first path of KR' is opened by the break contact 12A'—1, thus stopping the transmission of further pulses. At the same time, a circuit is closed for U' and UA, in parallel with the operated point selection relay F12—68 over make F12—68—5, make 12A'—3, and the windings of U' and UA to negative. The relay U' extends its operating circuit to relays K' and KA' through the make contact U'—1, thereby closing the relays K' and KA' and locking the relays F12—68, U', UA, K' and KA'. The locking circuit extends through the make contacts K'—2 and Z'—1, break contacts X'—1 and RL'—3 to positive. In addition, the break contact K'—3 opens the operating circuit for the point selection relay F12—68 for the group selection relays, so that no other point selection relay can be operated. The relay KA' also opens the holding circuit for the counting and code relays and for relay J', which would otherwise become effective after the release of D', with the result that all these relays release as soon as D' drops after the pulses cease.

At this stage, the substation has reached a condition identical with that after receiving a selection code from the orifice, except that U' and UA are operated. The relay UA prevents the transmission of further pulses from the substation by opening the circuit of S' and SA', and performs other functions necessary for an automatic indication from the substation. The substation is now ready for the reception of the check code from L. A., followed by the check and release pulse from the orifice.

The combined selection and indication code transmitted by the substation is received at the office, at L. A. and at all other substations. The latter are locked out as described hereinafter. At the office and at L. A. the point selection is registered on code relays 1C to 10C and the indication code on code relays 11C and 12C.

Selection and lamp control at office

When no further pulses follow after the twelfth pulse, relay D at the office drops after a predetermined delay, opening the original holding circuit for the counting and code relays, but a new holding circuit is established for them over make N—1, the winding of the relay J, make 12B—4, break KA—1, break 11C—3 and make 12C—3 for a tripped breaker, or make 11C—2 and break 12C—2 for a closed breaker, the winding of the relay M, breaks MA—4 and SA—3, breaks X—3, RM—2 and L—2 to positive. The relay J operates over this circuit and causes the operation of the point selection relay B12—68 and the relays K and KA as described above, while the relay M controls the lamp relay C and pulls the relay MA. Relays B12—68, K, KA and MA lock. The relay KA drops the counting and code relays and J and M, preparing the office for the reception of the code from L. A. The relay U, pulls in parallel with 12A and locks by the energization of its second winding, over make contact U—1.

The circuit for the relays J and M is completed only if twelve pulses are received and either pulse 11 or 12 is long, otherwise, this circuit is opened at the contacts of 12B, 11C and 12C. If more than twelve pulses are received, the thirteenth pulse pulls the lockout relay X from positive over make L—1 and break W—4, make 12B—3 and the winding of X to negative. The relay X locks over its other winding, through the make contact X—4 and the break contact RL—1, until the set is restored to normal.

As explained above, a point selection is made only after four long pulses are received in the first ten pulses. In other words, the office can complete a selection and control a point relay only if twelve pulses, consisting of a complete selection code and an indication, are received. Any other combination of pulses will not be able to effect a selection.

Selection and lamp control at L. A.

At L. A. a similar circuit for relays J" and M" is completed after D" drops, as follows: From positive over break L"—2 and X"—1, breaks S"—3 and K"—2 and the relay J", make 12B"—4, winding of relay M", break 12C"—2 and make 11C"—3 or make 12C"—3 and break 11C"—2 and make N"—1, to the counting and code relays, as previously described. The relay J" completes the circuit for the point selection relay B'12—68, which in turn pulls the relay K" and KA", the relay K" locking the relays B'12—68, K" and KA" and opening a circuit for the counting relays and relays J" and M". At the same time, the relay M" controls the point lamp relay C', depending upon the position of code relay 11C". In addition, the relay U", pulls over make 12A"—4 and locks over make U"—1, and the relay W' pulls over make M"—2, locking over make W'—1 and break V"—3.

L. A. transmits check code

As soon as the counting relays, including 1A", have released, a circuit is closed by W' for the starting relay S" from positive over breaks L"—2 and X"—1, break V"—1, make W"—3, break W1—1, break 1A"—3 and the winding of S" to negative. The relay S" pulls, closing a circuit for the relay T over make S"—2, make KA"—1, break 2A"—5, break J"—1 and the relay T to negative, which then transmits two short pulses to indicate that the selection and indication code has been received correctly at L. A. After two pulses, 2A" opens the circuit of T to stop the transmission of pulses and pulls the relay V", which locks over its other winding, and also opens the relay W'. The supervising office at L. A. is now prepared for the release pulse from the dispatcher's office. If this release pulse should fail to come through within the allotted time, the release of relays V", N" and Z" in sequence will open the locking circuit for B"12—68, K", U" and V", thereby restoring L. A. to normal.

L. A. check received at office and substation

The check code transmitted by L. A. is received at the office and at the substation. At the office, the L. A. check operates the relays AB and MB as described for the dispatcher's operation, thereby opening the circuit of the L. A. alarm relay LA, releasing the counting and code relays and M, and closing W instead of V, relay U being operated. If the L. A. check is not received within its allotted time, the release of N will pull W and also the L. A. alarm relay LA through the break contact N—3. The relay W causes the transmission of the release pulse, as described above, at the same time releasing the office.

Release

The release pulse, being either long or short, as determined by the position of lamp relay C of the selected point, releases the substation after restoring the point start circuit to normal, and resets L. A. as well as the other substations which have been locked out.

Check of release pulse at substation

At the substation, the check code from L. A. pulls relay AB', as described above, and AB' in turn pulls MA', which locks. The release pulse from the office functions as described above, resulting in the operation of R', and RL'. The relay U' being energized at this time, it will be seen that the circuit for controlling point start relay H', is completed only if MA' and R' operate. Since MA' is pulled in response to the check code from L. A. and R' operates as a result of the release pulse from the office, the point relay H' can be controlled only if the proper check is received from both L. A. and from the office. In case either or both are not properly received, point relay H' is not brought into agreement with the new position of the breaker, with the result that the substation makes a new attempt to transmit the indication as soon as it is released by relay Z', which drops a short time after D' and N'.

Substation fails to get correct check

Should a section of the line be in trouble, or any other reason prevent the reception of the two check codes, the substation would continue to make new attempts to transmit the indication until the trouble is corrected. This is not desirable and provision is, therefore, made to stop the substation after a predetermined number of attempts have been made.

Repeat attempts by substation

From the above description it will be seen that relays U' and UA pull if, and only if, the substation has transmitted a complete selection and indication code, but will not pull on selections initiated by the dispatcher or when the substation is locked out in the event that another station has started to transmit at the same time. The operation of U' and UA, therefore, indicates that the substation has succeeded in getting its transmission on the line and is now ready to receive the check codes from L. A. and from the dispatcher's office. Every time U' and UA pull, they prepare a test to determine whether or not the proper check codes have been received. If this is not the case, the unsuccessful attempt is registered on a counting circuit which resets the point relay H' after four unsuccessful attempts have been counted off.

When U' and UA pull, they operate the relay RA, which prepares a circuit for the relay RB over makes RA—2, RL'—2 and MA'—2. As explained above, MA' and RL' operate in response to the check codes from L. A. and from the office. If both check codes are properly received, RB pulls, locks over makes RA—2 and RB—1, and opens the circuit to RA by opening the break contacts RB—3, so that the release of the substation takes place in the normal manner.

However, if the substation fails to receive one or both of the check codes, the circuit for RB is not completed by the make contacts of relays MA' and RL'. In this case, the release of U' and UA, after the substation has gone through its functions, closes a circuit for the relay R1, from positive over breaks RB—3 and U'—4, make RA—1, break R2—5 and the winding of the relay R1 to negative.

Second attempt

The relay RA is slow-releasing, and before it has had time to release, the substation starts a new attempt, causing, among other things, the operation of Y'. This pulls the relay RC, from positive over make Y'—3, breaks X—5 and RX—1, make RA—3 and the winding of RC to negative. Soon after this, RA drops, opening the original circuit for R1, but R1 locks over make contact R1—2, the winding of the relay R2, break RB—2 and make RC—2. The relay R2 pulls over this circuit. If the next attempt is successful, the relay RB pulls, dropping R1 and R2. If the office or another station takes precedence over this substation, lockout relay X' opens RC, which in turn drops R1 and R2.

In case the substation succeeds in transmitting the entire selection and indication code, RC, R1 and RA remain operated, U' completing the circuit for RC when Y' drops after the tenth pulse. Unless the proper check codes are now received, RB does not pull, so that a circuit is closed for the second windings of R1 and R2, after U' releases, from positive over breaks RB—3, U'—4, make RA—1 and make R2—1, to the winding R2, and also to the winding R1 over make contacts R1—1. The windings of the relay R1 are connected differentially so that R1 drops while R2 holds until RA drops. Meanwhile, R3 pulls from positive over make RC—2 and break RB—2, break R1—3, make R2—2 and the winding R3. The relay R3 locks over make R3—1 and break R4—1.

Third and fourth attempts

If the third attempt is also unsuccessful, the release of U' and RA again operates R1 and R2 in succession as explained above. This closes a circuit for R4 from positive over make RC—2, break RB—2 and break R4—1, makes R3—1 and R2—2, make R1—4, the rectifier unit and the winding of R4 to negative, in section 70. The relay R4 locks over its own make contact and opens the locking circuit of the relay R3.

After the fourth unsuccessful attempt, the relays R1 and R2 drop in succession as described for the second attempt. The relay RX pulls after the fourth attempt from positive over make contacts R4—2, breaks R3—2 and R2—3, make 11A'—4 and the winding RX to negative. The relay RX operates the alarm relay AL' through make contacts RX—3, break AL'—1 and the winding AL'. The relay AL' locks through its make contact AL'—2 and the alarm release button. The contacts AL'—3 of the alarm relay close a circuit for the alarm bell shown.

Restoring point start circuit

After the first attempt, the position of relay H' is recorded on relay RD, which is connected in parallel with H' from the winding of H', over make contact of F12—68—1, breaks MA'—3, R4—4, R3—3, make R2—4, the winding RD and break R'—5 to positive. The relay RD pulls and locks over a second winding, if H' is operated at this time. Otherwise, RD remains deenergized.

After the second attempt, the winding of H' is connected over make F12—68—1, break MA'—3 and either break contact R4—4, and make contact R3—4, or over make contact R4—3, and make RX—2 to either the positive bus through make RD—3 or the negative bus through break RD—2. Assuming that H' is operated at this time, it will be shunted after four attempts, from the winding H' over make F12—68—1, break MA'—3, make R4—3, makes RX—2 and RD—3, the relay RX having been operated as previously described. Should the relay H' be deenergized at this time, the relay RD will be down also, and H' will pull over the same circuit, except that break RD—2, is now closed instead of make RD—3. The operation or release of H', as the case may be, restores the point circuit to normal, thus stopping further transmission from this point at the substation. The relay RC drops when the substation stops its transmissions, in turn releasing R1 and R4.

Lockout on extra pulses

If the substation is transmitting an indication and a further pulse is received after the twelfth pulse, lockout relay X' pulls from positive over make L'—1, make 12B'—2 and the winding of X' to negative. The relay X' locks over a second winding, through the make contact X'—2 and the break contact RL'—3. When the substation is receiving a selection code and more than ten pulses are received, the eleventh pulse pulls X from positive over make L'—1, breaks 12B'—3, 11B'—4, make 10B'—3, and break SA'—4.

Lockout when no selection is made

If pulses are received at the substation, but no selection is completed after the pulses stop, the release of N' closes a circuit for the second winding of X' from positive over make Z'—3, breaks S'—4, N'—2 and KA'—9 to the winding of X', this circuit being opened by the break contacts of KA' in case a selection has been made.

Lockout on transmission by two stations

If two or more stations are transmitting at the same time, there will come a time when one station transmits a short pulse and another station a long one. The station transmitting a short pulse at this time will be locked out by completing a circuit for the second winding of X' from positive over breaks P'—5, KR'—1, makes SA'—5 and Q'—2 to the winding of X'. At the station transmitting the long pulse, this circuit for X' is held open by the break contact of KR' until Q' drops and then by the make contact of Q' being open.

Release of lockout

Once the relay X is pulled, it locks over its second winding, as previously described, until the relay RL' pulls in response to a release pulse from the office.

B. Y. SWITCHING STATION

Point circuit

The position of breakers and other supervised devices at the B. Y. switching station is transmitted to L. A. from the dispatcher's office at the generating station, making use of the common circuits at the dispatcher's office for this purpose. As explained hereinbefore, the actual operation of the switching devices in the B. Y. switching station is controlled by direct-wire control from the dispatcher's office. The point selection relays for the B. Y. points are wired the same as the regular office point selection relays. However, in addition to a lamp relay C, these points are equipped with point breaker relays G and point start relays H, as shown similar to substation points. The contacts of these G and H relays are wired similarly to the contacts of the point selection keys so that any change in the position of the supervised devices will start the office transmitting.

The B. Y. points are segregated in certain groups, in the present case in group 1, and contacts of the group set-up relay 1 close a circuit for relay BY, when an indication is to be transmitted to L. A. The circuit for the relay BY extends from positive over break contacts RL—1 and X—5, make S—3, break 3B—6, make 1—5 and the winding of BY to negative. The relay BY performs the necessary switching operations to make the office transmit a twelve-pulse combined selection and indication code similar to a substation. This code operates the point selection and lamp relays at L. A. in the same manner as though a substation were sending, and L. A. acknowledges the reception of a correct code by its regular check code, whereupon the office follows with its release pulse to unlock the other substations which have been locked out by the selection code.

When the relay BY operates, it locks over its make contact BY—1 until the office is released, and performs the following operations: The break contact of the relay 10A in the circuit of the relay KR, is switched to a break contact of 12A through make contacts of 10A and BY in order that the office will transmit twelve pulses instead of ten. When 12B pulls during the twelfth pulse, a circuit is prepared over makes BY—6 and 12B—4, for the relays M and J in series, similar to the corresponding circuit for an automatic indication from a substation. In other words, the office acts as the transmitting station, but after the transmission is completed, the functions are exactly the same as for an automatic indication received from a substation.

The relay BY also changes the circuit, for the operating winding of the relay X so that it will not operate on the tenth pulse as it ordinarily does when the office is transmitting.

Either pulse 11 or 12 is made long to indicate the position of the breaker over contacts of the relay E1, which relay is connected in parallel with the point relay H, as soon as the point selection relay B pulls.

The relay BY furthermore prevents the operation of relay A, by shunting the break contacts K—5 through the contacts BY—9, and also pulls the point selection relay B immediately after the tenth pulse over makes BY—4 and 10A—7 which shunt the make contacts J—2. This is necessary to connect the relay E1 in parallel with H for the control of the indication code consisting of pulses 11 and 12.

At the same time, the circuit of relays K and KA, is kept open by break contacts BY—2 until pulse 12 is sent, in order to prevent premature stopping of the transmission. With the contacts BY—3 closed, relays K and KA are connected in parallel with the relay U which pulls on the twelfth pulse.

The indication code transmitted is registered by 11C over a make contact of the point relay B on a common relay 11D, which closes and locks over its second winding, through its make contact 11D—3 and make BY—1.

L. A. check and release

After the office has transmitted the complete selection and indication code, it waits for the check code from L. A., but will release after a predetermined interval in case the L. A. check does not come through within its allotted time, all these functions being the same as for an indication code from a substation, inclusive of the operation of the L. A. alarm relay LA. When the office transmits the release pulse by pulling relay W, the point start relay H is restored over the make contact of the point selection relay B and make W—5 and either make 11D—1 or break 11D—2 depending upon the previous position of the relay H. This restores the system to normal.

The foregoing has outlined the sequence of operation of the relays and circuits in selecting, operating and giving an automatic indication on a given point. This sequence is, in general, the same for all points except for the code transmitted and the point selected.

Master Checking

In the event that the dispatcher desires to check the position of all the circuit breakers in any substation, he depresses the master check key, one of which is provided for each substation. The closing of the master check key picks up a relay CM which locks over its make contacts CM—2. The make contacts CM—1, energize the group relay 45 and the point relay 80 in the same manner as the closing of the corresponding point selection key for these relays, thereby causing the office to transmit the selection code for this particular point which, in the present case, is the code 45—80. The proper point selection relay B45—80 in the office and relay F45—80 in the substation are operated in the same manner as described hereinbefore for a given point.

The operation of the point selection relay F45—80 in the substation picks up the checking relay CG, through make contacts of F45—80. The opening of the break contacts CG—1 of the relay CG in turn causes the relays G' and H' to function in the same manner as for an automatic operation of the circuit breaker for all the points or devices in the substation.

The closing of the point selection relay B45—80 in the office, which operates simultaneously with the corresponding point selection relay F45—80 in the substation, causes the office to transmit a reset impulse by the energization of the relay KR through the make contacts of B45—80—1, thereby restoring the system to normal in the manner hereinbefore described. In this manner, the checking relay CG in the substation is deenergized and its break contacts CG—2, are closed to permit the operation of the relays S' and SA', thereby causing the substation to transmit impulses in the manner hereinbefore described for the automatic operation of a circuit breaker. The order in which the checking code is transmitted is determined by the assignment of the codes to the various points in the substation, each point having its own definite code, as hereinbefore described. In this manner, the position of all points in the substation is checked in a definite sequence.

Summary

In order to simplify the diagram and description as much as possible, only a few group relays and point relays have been shown. It will be understood that additional group and point relays for controlling additional points or devices may be readily provided.

Furthermore, it will be understood that the group and code relays may be assigned to points located in different substations throughout the system, each device or circuit breaker in the entire system having its own distinct code which is not repeated for any other device in the system. Thus, the group relays assigned to a particular substation will appear only at that particular substation, and not all at one substation, as shown in the present drawings for the sake of simplicity. However, the common equipment which is shown in the present drawings is the same for all substations.

Only a few of the point selection relays are shown at the dispatcher's office and the substations. However, the additional point selection relays are connected to the points indicated on the drawings in the same manner as the relays shown.

The foregoing description covered in detail the fundamental circuit operations for the selection and operation of a given point 12—68, and fully described the functions of the various circuits. The operations for other points are similar except for the differences in the selection code.

From the foregoing description it is apparent that I have provided a fast, positively interlocked means of remotely controlling a power transmission system from a central point over a carrier channel. In addition, the system provides an automatic indication at another point of all the devices in the power transmission system.

Since many modifications may be made in the apparatus and arrangement of parts without departing from the spirit of my invention, I do not wish to be limited other than by the scope of the appended claims.

I claim as my invention:

1. In a supervisory control system, a first station, a second station, a signalling channel connecting said stations, apparatus units at the second station, means including transmitting and receiving relays at said stations for transmitting and receiving over the signalling channel predetermined selection and control codes of impulses, means responsive to said code impulses for selecting and controlling the apparatus units, said codes being composed of predetermined combinations of long and short impulses, the selection codes being individual for each apparatus unit and the controlling codes being common for all units, all of said selection codes having the same total number of impulses and the same number of long impulses, said selection codes being distinguished by the location of the long impulses therein, and means responsive to the total number of impulses for preventing the selection of a unit unless the total number of impulses transmitted and received is correct and the total number of long impulses transmitted and received equals the predetermined number of long impulses.

2. In a supervisory control system, a first station, a second station, a signalling channel connecting said stations, apparatus units at the second station, means including transmitting and receiving relays at said stations for transmitting and receiving over the signalling channel predetermined selection and control codes of impulses means responsive to said code impulses for selecting and controlling the apparatus units, each of said codes being composed of a predetermined number of long and short impulses, the selection codes being individual for each apparatus unit and the controlling codes being common for all units, all of said selection codes having the same total number of impulses and the same number of long impulses, said selection codes being distinguished by the location of the long impulses therein, and means responsive to the total number of impulses for preventing the selection of a unit unless the total number of impulses transmitted and received is correct and the total number of long impulses transmitted and received equals the predetermined number of long impulses.

3. In a supervisory control system, a first station, a second station, a signalling channel connecting said stations, apparatus units at the second station, means including transmitting and receiving relays at the stations for transmitting and receiving predetermined codes of impulses over the signalling channel, means responsive to said code impulses for controlling and indicating the operation of the apparatus units, manually operable means at the first station for controlling the operation of said relays to select and release an apparatus unit, indicating means at the first station operable by said relays for indicating the position of the apparatus units, the selection code being determined by said manually operable means and the release code being determined by the condition of said indicating means, and means in the second station responsive to the release code for initiating the operation of the transmitting relays therein in case the condition of said indicating means does not agree with the actual position of the selected apparatus unit.

4. In a supervisory control system, a first station, a second station, a signalling channel connecting said stations, apparatus units at the second station, means including transmitting relays at the first station for transmitting predetermined combinations of code impulses over the signalling channel to select and operate the apparatus units, means including a pair of cooperating relays responsive to the operation of an apparatus unit at the second station for transmitting code impulses indicating the automatic operation of the apparatus unit, said indicating impulses being transmitted when said pair of relays are either both energized or both deenergized, and means including counting relays at the second station for resetting one of said pair of relays thereby stopping the transmitting of said impulses from said second station after a predetermined number of attempts.

5. In a supervisory control system, a dispatching office, a substation, a supervising office, a plurality of apparatus units at the substation, a signalling channel connecting said offices and said station, means including transmitting and receiving relays in said offices and said station for transmitting and receiving predetermined combinations of code impulses over said channel, means responsive to said code impulses for controlling and indicating the operation of said apparatus units, manually operable means in the dispatching office for controlling the operation of the transmitting relays therein, means in the substation responsive to the condition of the apparatus units for controlling the operation of the transmitting relays therein to send a combined checking and indicating code, means including selection and code relays in the supervising office responsive to code impulses received from the dispatching office and the substation for transmitting checking impulses to the dispatching office indicating the reception of the code impulses at the supervising office, and cooperating relay and signalling means in the dispatching office for indicating the reception or non-reception of the checking impulses from the supervising office.

6. In a supervisory control system, a dispatching office, a substation, a supervising office, a plurality of apparatus units at the substation, a signalling channel connecting said offices and said station, means including transmitting and code relays at the dispatching office for transmitting predetermined selection code impulses over said channel to select an apparatus unit, means including receiving, selection, indicating and transmitting relays at the substation for receiving said code impulses and for transmitting a check code indicating both the proper reception of said selection code impulses and the position of the apparatus unit, and means including receiving, selection and transmitting relays at the supervising office for receiving said code impulses and said check code and for transmitting an additional check code indicating the proper reception of said code impulses and said check code, said check codes being different from said selection code.

7. In a supervisory control system, a first station, a second station, a signalling channel connecting said stations, apparatus units at the second station, means including transmitting and receiving relays at said stations for transmitting and receiving predetermined combinations of code impulses over said channel, means responsive to said code impulses to control and indicate the operation of the apparatus units, a pair of cooperating relays in the second station responsive to the operation of an apparatus unit for initiating the operation of the transmitting relays therein, said pair of relays being so disposed that the second station transmits an indication to the first station when both relays are deenergized or when they are both energized, and means at the second station responsive to code impulses from the first station for controlling the energization of one of said pair of relays, the energization of the other of said pair of relays being controlled by the operation of an apparatus unit.

8. In a supervisory control system, a dispatching office, a substation, a signalling channel connecting said stations, apparatus units at the substation, means including transmitting and receiving relays at the office and the station for transmitting and receiving predetermined codes of impulses over the signalling channel, means responsive to said code impulses for controlling and indicating the operation of the apparatus units, manually operable means at the office for controlling the operation of said relays to select and release an apparatus unit, indicating means at the office for indicating the position of the apparatus units, each unit having a selection code different from the other units, the release code being determined by the condition of the indicating means for the selected unit, and means including point and transmitting relays at the substation responsive to the release code for bringing the conditions of the indicating means at the office into agreement with the position of the apparatus unit when the release code is received.

9. In a supervisory control system, a dispatching office, a substation, a signaling channel connecting said office and said substation, a plurality of apparatus units at the substation, means including transmitting and receiving relays in said office and said station for transmitting and receiving predetermined combinations of code impulses over said channel, means responsive to said code impulses to control and indicate the operation of said apparatus units, means in the substation including a pair of relays having cooperating contact members disposed to initiate the operation of the transmitting relays therein, and means at the substation responsive to code impulses from the dispatching office for controlling the energization of one of said pair of relays, the energization of the other of said pair of relays being controlled by the operation of an apparatus unit.

10. In a supervisory control system, a dispatching office, a substation, a supervising office, a signaling channel connecting said offices and said station, a plurality of apparatus units at the substation, means including transmitting and receiving relays in said offices and said station for transmitting and receiving predetermined combinations of code impulses over said channel, manually operable means in the dispatching office for initiating the operation of the transmitting relays therein, means in the substation responsive to the operation of the apparatus units for initiating the operation of the transmitting relays therein, means responsive to said code impulses for controlling and indicating the operation of said apparatus units, and means in the supervising office responsive to code impulses received from the dispatching office and the substation for initiating the operation of the transmitting relays in the supervising office, thereby sending checking impulses from the supervising office to the dispatching office indicating the reception of the code impulses at the supervising office.

11. In a supervisory control system, a dispatching office, a substation, a supervising office, a signaling channel connecting said offices and said station, a plurality of apparatus units at the substation, means including transmitting and receiving relays in said offices and said station for transmitting and receiving predetermined combinations of code impulses over said channel, manually operable means in the dispatching office for initiating the operation of the transmitting relays therein, means in the substation responsive to the operation of the apparatus units for initiating the operation of the transmitting relays therein, means responsive to said code impulses for controlling and indicating the operation of said apparatus units, and means in the supervising office responsive to code impulses received from the dispatching office and the substation for transmitting checking impulses to the dispatching office indicating the reception of the code impulses at the supervising office.

12. In a supervisory control system, a dispatching office, a substation, a supervising office, a signaling channel connecting said offices and said station, a plurality of apparatus units at the substation, means including transmitting and receiving relays in said offices and said station for transmitting and receiving predetermined combinations of code impulses over said channel, manually operable means in the dispatching office for initiating the operation of the transmitting relays therein, means in the substation responsive to the operation of the apparatus units for initiating the operation of the transmitting relays therein, means responsive to said code impulses for controlling and indicating the operation of said apparatus units, means in the supervising office responsive to code impulses received from the dispatching office and the substation for transmitting checking impulses to the dispatching office indicating the reception of the code impulses at the supervising office, and means in the dispatching office responsive to the reception of the checking impulses from the supervising office for indicating the reception of the code impulses at the supervising office.

13. In a supervisory control system, a dispatching office, a substation, a supervising office, a signaling channel connecting said offices and said station, a plurality of apparatus units at the substation, means including transmitting and receiving relays at the dispatching office for transmitting and receiving predetermined code impulses over said channel, means including receiving, selection, indicating and transmitting relays at the substation for receiving said code impulses and for transmitting a check code indicating the proper reception of said code impulses and the position of an apparatus unit, means responsive to said code impulses for controlling and indicating the operation of the apparatus unit, and means including receiving, selection and transmitting relays at the supervising office for receiving said code impulses and said check code and for transmitting an additional check code indicating the proper reception of said code impulses and said check code.

HANS P. BOSWAU.